(12) United States Patent

Nieuwsma et al.

(10) Patent No.: US 12,560,991 B2

(45) Date of Patent: *\*Feb. 24, 2026*

(54) AUTOMATED POWER CONSUMPTION MANAGEMENT THROUGH APPLYING OF A SYSTEM POWER CAP ON HETEROGENOUS SYSTEMS

(71) Applicant: HEWLETT PACKARD ENTERPRISE DEVELOPMENT LP, Spring, TX (US)

(72) Inventors: Andrew Nieuwsma, Spring, TX (US); Torsten Wilde, Berlin (DE)

(73) Assignee: Hewlett Packard Enterprise Development LP, Spring, TX (US)

( \* ) Notice: Subject to any disclaimer, the term of this patent is extended or adjusted under 35 U.S.C. 154(b) by 203 days.

This patent is subject to a terminal disclaimer.

(21) Appl. No.: 18/303,414

(22) Filed: Apr. 19, 2023

(65) Prior Publication Data

US 2024/0353909 A1 Oct. 24, 2024

(51) Int. Cl.
*G06F 1/3206* (2019.01)

(52) U.S. Cl.
CPC ................................. *G06F 1/3206* (2013.01)

(58) Field of Classification Search
CPC ..................................................... G06F 1/3206
See application file for complete search history.

(56) References Cited

U.S. PATENT DOCUMENTS

| | | | |
|---|---|---|---|
| 6,879,930 B2 | 4/2005 | Sinclair et al. | |
| 7,330,604 B2 | 2/2008 | Wu et al. | |
| 8,627,123 B2 * | 1/2014 | Jain ....................... | G06F 1/3209 |
| | | | 718/104 |
| 8,982,091 B1 | 3/2015 | Mohindra | |
| 9,405,348 B2 | 8/2016 | Jackson | |
| 10,101,786 B2 | 10/2018 | Eastep et al. | |
| 10,872,086 B2 | 12/2020 | Moerkotte et al. | |
| 11,644,882 B2 | 5/2023 | Kuno et al. | |
| 2010/0037077 A1 * | 2/2010 | Kashyap ............... | G06F 9/5094 |
| | | | 713/330 |

(Continued)

FOREIGN PATENT DOCUMENTS

WO 2014/101668 A1 7/2014

OTHER PUBLICATIONS

Borghesi, Andrea, Power Capping in High Performance Computing Systems, Sep. 2015, Lecture Notes in Computer Science (Conference) (Year: 2015).*

(Continued)

*Primary Examiner* — Kim Huynh
*Assistant Examiner* — Cole Jiawei Wentzel
(74) *Attorney, Agent, or Firm* — Sheppard Mullin Richter & Hampton LLP

(57) ABSTRACT

Automated systems and methods are provided for distributing a system power cap amongst system equipment for efficient utilization of power cap ranges without requiring an understanding of intricacies of the system architecture. Examples of the systems and methods automatically, responsive to trigger events, distribute the system power cap amongst system equipment. Another example provides for grouping of system equipment into multiple pools and distributing the system power cap to system equipment on a per-pool basis, according to a prioritized order.

20 Claims, 9 Drawing Sheets

(56) References Cited

U.S. PATENT DOCUMENTS

| | | | |
|---|---|---|---|
| 2013/0226362 A1* | 8/2013 | Jagadishprasad | G06F 1/3203 |
| | | | 700/297 |
| 2013/0274948 A1 | 10/2013 | Matsuo et al. | |
| 2014/0068282 A1* | 3/2014 | Jenne | G06F 1/3234 |
| | | | 713/300 |
| 2014/0298349 A1 | 10/2014 | Jackson | |
| 2021/0341984 A1 | 11/2021 | Wilde et al. | |
| 2024/0353911 A1 | 10/2024 | Nieuwsma et al. | |

OTHER PUBLICATIONS

Lenhardt, Joerg, Power Efficient Load Distribution in Heterogeneous Computing Environments, Feb. 17-19, 2014, Parallel and Distributed Computing and Networks, p. 239-248 (Year: 2014).*

Corbalan et al., "Ear: Energy management framework for supercomputers", 2018, 10 pages.

Intel Corporation, "Global Extensible Open Power Manger (GEOPM)", available online at <https://geopm.github.io/.>, retrieved online Apr. 10, 2025, 3 pages.

Martin et al., "Cray Advanced Platform Monitoring and Control (CAPMC)," Apr. 2015, Proc. Cray Users' Group Technical Conference (CUG), 10 pages.

* cited by examiner

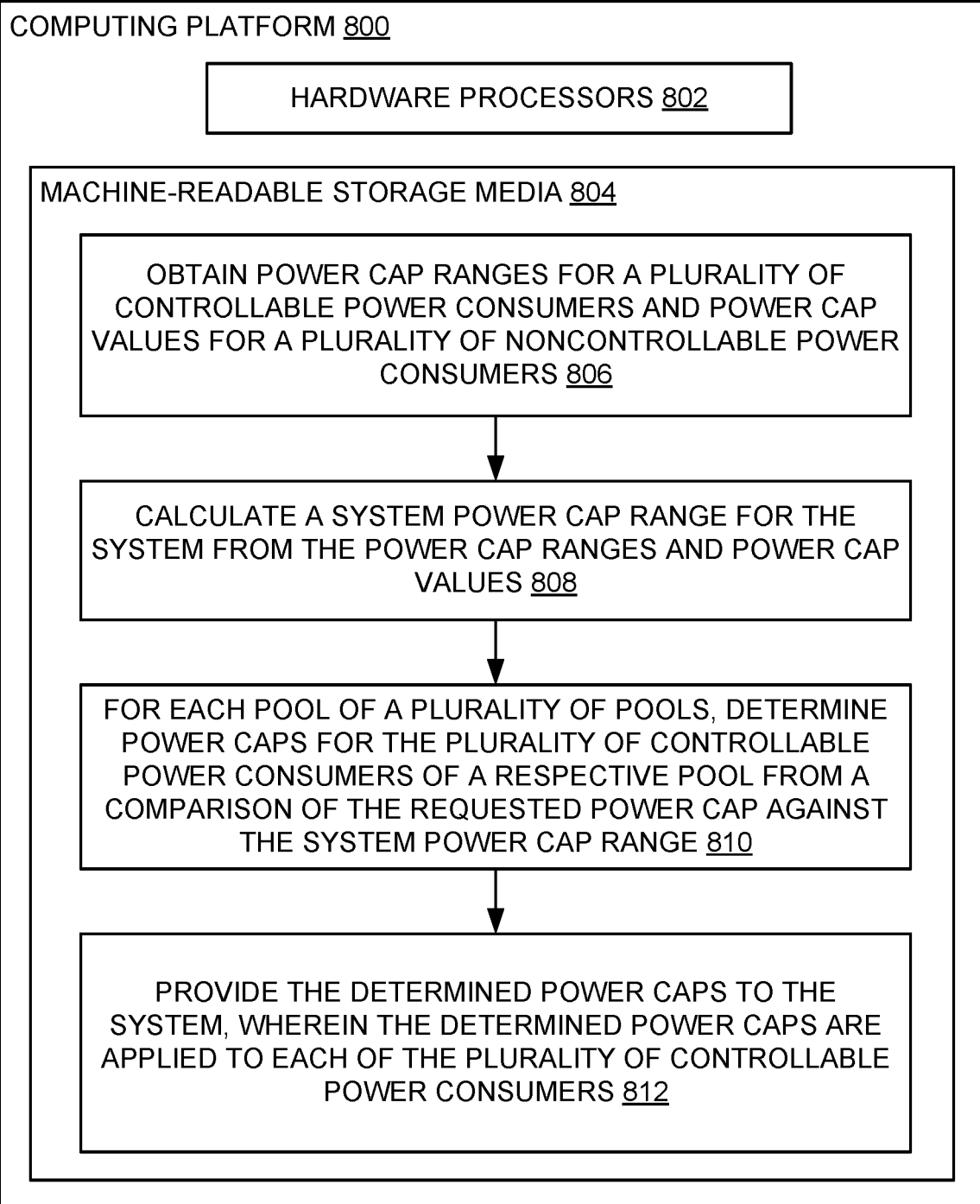

COMPUTING PLATFORM 800

HARDWARE PROCESSORS 802

MACHINE-READABLE STORAGE MEDIA 804

OBTAIN POWER CAP RANGES FOR A PLURALITY OF CONTROLLABLE POWER CONSUMERS AND POWER CAP VALUES FOR A PLURALITY OF NONCONTROLLABLE POWER CONSUMERS 806

CALCULATE A SYSTEM POWER CAP RANGE FOR THE SYSTEM FROM THE POWER CAP RANGES AND POWER CAP VALUES 808

FOR EACH POOL OF A PLURALITY OF POOLS, DETERMINE POWER CAPS FOR THE PLURALITY OF CONTROLLABLE POWER CONSUMERS OF A RESPECTIVE POOL FROM A COMPARISON OF THE REQUESTED POWER CAP AGAINST THE SYSTEM POWER CAP RANGE 810

PROVIDE THE DETERMINED POWER CAPS TO THE SYSTEM, WHEREIN THE DETERMINED POWER CAPS ARE APPLIED TO EACH OF THE PLURALITY OF CONTROLLABLE POWER CONSUMERS 812

FIG. 8

AUTOMATED POWER CONSUMPTION MANAGEMENT THROUGH APPLYING OF A SYSTEM POWER CAP ON HETEROGENOUS SYSTEMS

BACKGROUND

High-performance computing (HPC) refers to the systems used to solve large and complex computational problems. Typically, HPC requires specialized, high-performance hardware that drive massively paralleled central processing units (CPUs). For many years, supercomputers have been the predominant hardware used to run massive calculations. However, recent advances in technology have provided alternate means of performing HPC that is far less expensive than traditional supercomputers.

One of the new approaches to HPC involves the use of clusters. Clusters are standalone system equipment that are networked together into a paralleled processor systems. Each system equipment runs independently and solves part of a distributed computation. The availability of cheap but powerful personal computers combined with fast networking technologies has made clustering as effective as supercomputers in solving large computational problems, but at a far cheaper price. Although clustering of system equipment has been beneficial in providing HPC, the management of clustered systems is not trivial. Administering hundreds of independently running system equipment poses many challenges, including physical aspects (heat removal, access for maintenance, etc.) and system administration tasks (setting up machines, checking status, etc.). Approaches for addressing these and related issues may therefore be desirable.

BRIEF DESCRIPTION OF THE DRAWINGS

The present disclosure, in accordance with one or more various implementations, is described in detail with reference to the following figures. The figures are provided for purposes of illustration only and merely depict typical or example implementations.

FIG. 8 is an example computing component that may be used to implement various features of distributing a system power cap in accordance with the implementations disclosed herein.

Figure 1:
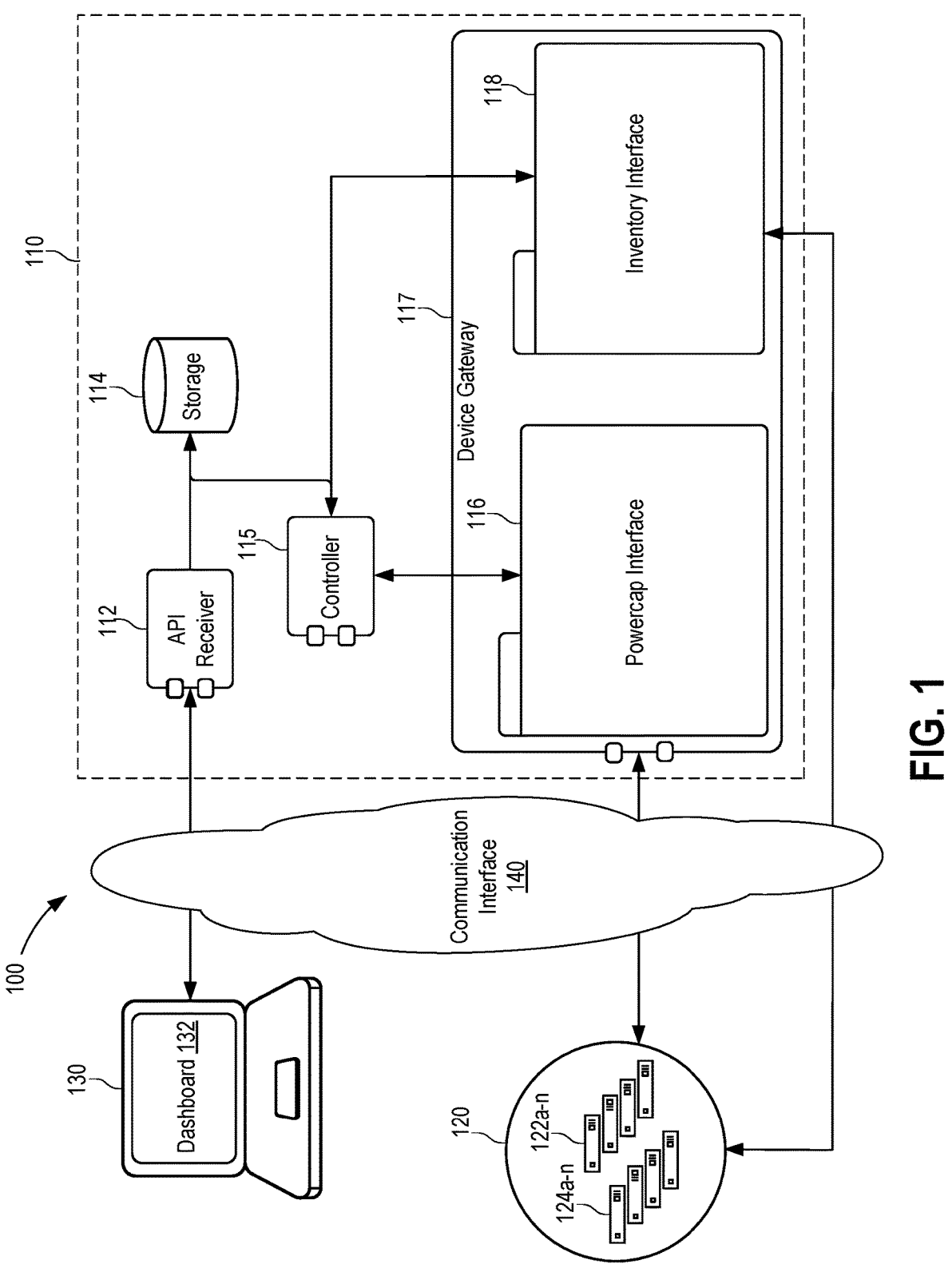
FIG. 1 illustrates an example for a system architecture and corresponding high-level message flow in which the present disclosure may be implemented.

The figures are not exhaustive and do not limit the present disclosure to the precise form disclosed.

DETAILED DESCRIPTION

As described above, administering numerous independently running system equipment to perform a computation (also referred to as a workload or job) poses many challenges. For example, administering a managing power consumption across numerous independently running system equipment is an increasingly complex problem with a rapidly changing HPC landscape due to rising energy prices, increasing regulatory concerns around data center sustainability (e.g., reduction of carbon footprint, total power burden on the grid, etc.), and increases in system power consumption as HPC systems become larger. System operators and administrators are seeking solutions that provide for efficient management of this changing landscape. The implementations disclosed herein address the above concerns by providing systems and methods for distributing a system wide power cap amongst a number of system equipment that can be implemented for HPC.

Setting a power cap in a basic way, particularly in the case of a homogenous HPC system, is a relative straight forward process since all system equipment are the same. Thus, a system power cap can be distributed by allocating the same share (e.g., ration) of the overall power budget for the system. A power budget may refer to a target power consumption that an entire system has to stay under, while a power cap limit on power consumption permitted that can be set on system equipment. To determine an amount of how much power cap can be applied, power consumption of non-controllable power consuming system equipment (e.g. static power, overhead power, etc.) can be subtracted from the power budget, and that remainder may be the maximum power cap that can be allocated to controllable system equipment.

However, with increasing diversity in accelerator types and a need to support a wide variety of workloads as efficiently as possible, heterogeneous systems are becoming increasing prevalent in HPC system architecture. In addition, system equipment architectures are moving towards heterogeneous computing devices as well. The implications are that: different equipment architectures with different computing device types will have different minimum and maximum power boundaries; different power cap values will have different impacts on equipment architecture performance; and a system-wide power cap may not be evenly divided according to the number of pieces of equipment for efficient use of a power budget. Different computing device types may be delineated according to different stock keeping unit numbers or SKUs, or other unique identifier that distinguish between unique product models.

For example, a system-wide power budget can be expressed as Equation 1 as a summation of non-controllable power consuming system equipment (referred to herein as non-controllable system equipment) and controllable power consuming system equipment (referred to herein as controllable system equipment). Controllability and non-controllability of system equipment is used herein to refer to an ability to control or modify a power cap setting within a respective piece of equipment.

$$\text{System Power Budget} = \qquad \text{Eq. 1}$$
$$\sum_{j=1}^{S} \text{noncontrollable consumers}_{Nameplate\ Power} +$$
$$\sum_{j=1}^{N} \left( \text{NodePower}_{Base\ Power} + \sum_{k=1}^{C} CPU_k + \sum_{l=1}^{A} \text{Accelerator}_l \right)$$

where $$\sum_{j=1}^{S} \text{noncontrollable consumers}_{Nameplate\ Power}$$

represents a sum of power consumption of non-controllable system nodes, such as, but not limited to, support infrastructure (e.g., power distribution, system cooling, etc.) and system components and/or system nodes that either cannot be, should not be, or designated as not to be controlled, such as, but not limited to, login nodes, network equipment, system management controllers, input/output (I/O) subsystem etc., for which the name plate power or any alternative safeguard power value can be used;

$$\sum_{j=1}^{N} (\ )$$

represents system components and/or compute nodes whose power consumption can be controlled (e.g., representing those compute nodes for an HPC systems that can be controlled); NodePower$_{Base\ Power}$ represents a sum of all non-controllable consumers (or node components) of a respective piece of system equipment;

$$\sum_{k=1}^{C} CPU_k + \sum_{l=1}^{A} \text{Accelerator}_l$$

represents node components whose power consumption can be controlled (e.g. individual compute units on the nodes).

As shown in Equation 1, the system wide power consumption can be expressed as the sum of two terms. One term $$\left( e.g., \sum_{j=1}^{S} \text{noncontrollable consumers}_{Nameplate\ Power} \right)$$

defines a maximum possible power consumption of system equipment that cannot be controller and the other $$\left( e.g., \sum_{j=1}^{N} \left( \text{NodePower}_{Base\ Power} + \sum_{k=1}^{C} CPU_k + \sum_{l=1}^{A} \text{Accelerator}_l \right) \right)$$

defines the sum of the power consumed by any controllable system equipment. In this example, the sum of the power consumed by a controllable system equipment is based on a sum of a fixed base power consumption—which, depending on the compute unit design, could include memory power—and power consumption of the different compute units or components on the node. Thus, a power cap for the system can be determined by subtracting the $$\sum_{j=1}^{S} \text{noncontrollable consumers}_{Nameplate\ Power}$$

from a system power budget.

Setting useful power caps on a heterogeneous system, which is a system consisting of a number of heterogeneous pieces of equipment, is challenging. For example, consider Table 1, which provides example hardware capped power ranges (e.g., hardware defined power caps ranges) for two types of heterogeneous hardware:

TABLE 1

Example, heterogeneous hardware power capping ranges

| Model Type | Min Power Cap in Watts | Max Power Cap in Watts | Max − Min Power Cap (Delta) in Watts | # nodes |
|---|---|---|---|---|
| Equipment Type 1 - Homogenous node (2 CPUs) | 350 | 925 | 575 | 1536 |
| Equipment Type 2 - Heterogeneous node (1CPU, 4 GPUs) | 764 | 2754 | 1990 | 2560 |

A conventional approach would take a system-wide power cap (e.g., the allowed combined power consumption of all system equipment), divide the system-wide power cap by the number of pieces of system equipment, and set the resulting value as a uniform power cap on all system equipment across the system. As can be seen in Table 1, depending on the system-wide power cap, there is a potential of little to no overlap between the hardware defined power ranges for different hardware architectures implemented as the different node types. For example, referring to Table 1, equipment type 1 has a max power cap of 925 Watts and equipment type 2 has a minimum power cap of 764 Watts, and setting a uniform power cap for all nodes may place a cap within this range. Given the little overlap between the hardware defined power cap ranges, the uniform power cap would fail to effectively utilize the power cap delta of equipment type 2 because much of the power cap range does not overlap with the range of equipment type 1. Thus, it can be difficult to find a 'universal' applicable power cap that can be applied uniformly across all hardware types in a heterogeneous system. Furthermore, the likelihood that a uniform equipment power cap calculated from a system-wide power cap would fall within the allowed equipment power limits becomes smaller with increased diversity in equipment types of a heterogeneous HPC system.

The technology disclosed herein enables a system administrator or operator to set a system-wide power cap that can be distributed amongst system equipment for efficient utilization of power cap ranges without an understanding of the intricacies of heterogeneous system architecture. Implementations of the disclosed technology provide a mechanism configured to intelligently set power caps on a system equipment basis according to a specified system-wide power cap and distribution policies. The system-wide power cap can be split into individual power caps on an equipment type basis according to equipment characteristics and end-user defined tradeoffs providing an optimal power cap distribution applicable to homogeneous and/or heterogeneous system and homogeneous and/or heterogeneous equipment architectures using an out-of-band (OOB) system control. OOB system control refers to systems and devices that provide for accessing and managing networked architecture from a remote location that is separate from the networked architecture.

Example implementations disclosed herein calculate and allocate power caps on system equipment basis based on a requested system-wide power cap, distribution policy, and according to individual equipment power management capabilities. The disclosed technology determines an optimal distribution of a system-wide power cap specified for a system, which can have a multi-equipment architecture. The optimal distribution can be based on an end-user defined/ requested power cap and application of a distribution scheme that defines an allocation of power caps to system equipment so to efficiently distribute the requested power cap amongst controllable system equipment on the system. The system architecture can comprise a number of controllable system equipment and a number of non-controllable system equipment. The controllable system equipment can be heterogenous, in that the controllable system equipment may comprise a number of different equipment types, each having a hardware defined power cap range that is dissimilar to that of other equipment types.

In an example implementation, the disclosed technology obtains power cap ranges of system equipment on a system, which may be heterogenous or homogenous. For example, the system may comprise a plurality of controllable compute nodes and a plurality of non-controllable system equipment. The disclosed technology may obtain power cap ranges for the plurality of controllable system equipment and power cap values for the plurality of non-controllable system equipment. The power cap values for the non-controllable system equipment may be fixed values defined by hardware architecture of the respective system equipment. Similarly, the power cap ranges may be defined by hardware architectures of the respective system equipment. The plurality of controllable system equipment can include a number of dissimilar equipment types each having dissimilar power cap ranges. A system-wide power cap range for the system can be determined from the power cap ranges and power cap values. A system-wide power cap for the plurality of controllable system equipment can be set based on a requested power cap specified for the system, for example, based on an input by an end-user (e.g., operator, administrator, or other user). From the set system-wide power cap, individual power caps for each of the plurality of controllable system equipment can be determined based on a comparison of the set system-wide power cap against the system power cap range, where individual power caps for the dissimilar equipment types are based on the dissimilar power cap ranges. For example, a distribution scheme may be applied to the plurality of controllable system equipment that determines an individual allocation of power cap for each controllable system equipment based on, in part, on the set system-wide power cap. This allocation can be applied respectively to dissimilar power caps thereby efficiently utilizing each dissimilar power cap range. The disclosed technology can then provide the determined power caps to the system, which can be applied to each of the plurality of controllable system equipment for managing the power consumption across the system.

In an example implementation, inputs from a user can be received specifying a Requested_Power_Cap. A system-wide power cap range can be determined from power cap ranges of each individual controllable system equipment on the system. For example, the system-wide power cap can be calculated from a sum of minimum allowable power cap of all controllable system equipment (Sum_Min) and a sum of a maximum allowable power cap of all controllable system equipment (Sum_Max). An optimal power cap distribution can be determined based on a comparison of the Requested_Power_Cap to the system-wide power cap range, and application of a power distribution scheme selected from a plurality of power distribution schemes.

Power usage by the controllable consumers can then be capped by application of an optimal power cap distribution. For example, if the Requested_Power_Cap exceeds or is equal to Sum_Max, then the Requested_Power_Cap may be set to the maximum and power caps for all controllable consumers can be set to the maximum power cap of the hardware defined ranges. If the Requested_Power_Cap is below Sum_Min, then an error can be returned, the Requested_Power_Cap may be set to Sum_Min and power caps for the controllable consumers may be set to minimum power cap, and/or certain controllable consumers can be deactivated to reach the Requested_Power_Cap. Otherwise, one or more distribution schemes can be applied, each of which can determine a power cap allocation amount for incrementing power caps of the plurality of controllable system equipment within respective power cap ranges of the controllable system equipment. Each distribution scheme calculates power cap for each controllable system equipment by determining an allocation amount for incrementing power caps of all controllable system equipment until the system power usage, when operated at the highest allowable power usage (e.g., sum of maximum allocated power caps), meets the Requested_Power_Cap. An optimal distribution scheme can be selected from the one or more distributions scheme that provides optimal system power usage, such as the distribution scheme that provides for the system power usage that is closes to the Requested_Power_Cap.

The determined power cap ranges can then be supplied to the system for setting as actual power caps at each of the controllable system equipment. For example, implementations disclosed herein may transmit a message packaged within instructions to apply power caps to each controllable system equipment. Each controllable system equipment can unpackage the instructions and set its actual power cap accordingly. As a result, the system can operate such that the system-wide power usage does not to exceed the Requested_Power_Cap due to power caps set within the system equipment.

In another example implementation, the disclosed technology provides for distributing a system-wide power cap according to clustering of compute nodes. For example, compute nodes of a system can be clustered into a number of pools, each pool comprising one or more compute nodes and/or system nodes. An optimal distribution of a system-wide power cap can be determined based on a user defined/ requested power cap on a pool-by-pool basis through application one or more distribution schemes that allocates power caps to controllable compute nodes of each pool. The pools can be prioritized according to power consumption and iterated through in order of prioritization, such that controllable compute nodes of higher prioritized pools may be allocated higher power caps. For example, pools of nodes can be prioritized such that power caps may be allocated to higher priority pools first, before allocating power caps to lower prioritized pools. This approach permits higher prioritized pools to be allocated higher power caps, relative to the lower prioritized pools.

In an example implementation, the disclosed technology receives a Requested_Power_Cap for the system, obtains configurations of pools of controllable compute nodes, and priorities assigned to each pool. The disclosed technology can determine an optimal power cap distribution for on a pool-by-pool basis according to priority through a comparison of the Requested_Power_Cap to a system-wide power cap range and application of a distribution scheme. That is, for example, for each pool of compute nodes is assigned a priority level and the Requested_Power_Cap can be distributed on a pool-by-pool basis in order of priority level (e.g., starting with highest prioritized pool in terms of power consumption and proceeding in order to the lowest prioritized pool in terms of power consumption), an optimal power cap distribution for the controllable compute nodes of a respective pool can be determined by application of a distribution scheme, as described above.

Further, the implementations disclosed herein may be automated based on an occurrence of trigger event. Trigger events may include system events, such as initiating of job or workload; receipt of a requested power cap or power budget, such as an update to a previously inputted requested power cap/power budget; period of time, such as detected by a periodic timer. In an example, the disclosed technology can be configured to detect or other recognize the occurrence of one or more trigger events and, responsive to the detection, compute an optimal power cap distribution for controllable compute nodes, as described above.

The technology according to the present disclosure provides serval non-limiting advantages. For example, implementations disclosed herein can be provide for OOB system power management of both homogenous and heterogenous systems, which can address system administrator and/or operators demands for OOB power management. Implementations disclosed herein provide solutions for a setting a system-wide power cap that can be divided amongst system equipment of various types according to equipment characteristics (e.g., hardware defined power cap ranges) and system tradeoffs (e.g., tradeoffs between power consumption and time to completed computation), thereby providing an optimal power distribution for both homogeneous and heterogeneous system. Taking system tradeoff into account enables system optimization between energy efficiency and performance.

To further highlight the advantages offered by the disclosed technology, below are some examples of use cases that illustrate non-exhaustive benefits that can be achieved by the disclosed technology. For example, an application run on a piece of system equipment may use only two GPUs, instead of four provided by the equipment (e.g., equipment type 2 in Table 1). The power distribution under an equipment power cap can thus be shifted to provide more power to the used compute units or components (e.g., two GPUs) or even to shift unused power between system equipment and jobs. As another example, a site with a heterogeneous system may need to set a system power cap of 80% of a maximum power capacity to accommodate for decreased power availability or decreased operating expense. The disclosed technology can receive this reduced power cap and redistribute the power share among dissimilar system equipment to efficiently provide resources while maintaining a reduced power cap. In yet another example, a site might need to decrease the system power consumption below a supported minimal power cap. Rather than switching off the complete system (e.g., since the power cap is not supported) a policy defining which system equipment to turn off first to provide enough power to run a subset of system equipment at minimal supported power is provided. Still further, a system administrator or operator might require minimum equipment performance guaranties. By defining minimal power caps for different equipment types, the disclosed technology can guarantee a minimum equipment performance even under a reduced system-wide power cap.

As used herein, "heterogeneous equipment" refers to a piece of system equipment consisting of multiple different compute architectures used within the system equipment. For example, a system equipment consisting of one CPU and four GPUS may be considered a heterogenous equipment. As used herein, "heterogeneous system" refers to a system that consists of different equipment architectures.

As used herein, "homogeneous equipment" refers to a piece of system equipment consisting of a common or same compute architecture used within the system equipment. For example, a system equipment consisting of two CPUs, where each CPU has the same speed and core size, may be considered a homogeneous equipment. In another example, a system equipment consisting of two CPUs of the same model (e.g., same SKU) and/or type may be considered homogeneous equipment. As used herein, "homogeneous system" refers to a system that consists only of system equipment of the same architecture.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example for a system architecture 100 and corresponding high-level message flow in which the present disclosure may be implemented. Architecture 100 may be logically separated into three layers: a computation layer comprising a plurality of nodes 122a-n and 124a-n, a services layer, and an end-user layer where distribution policies and power budgets may be input by end-users (e.g., owners and/or administrators) and analytics may be presented and evaluated. The service layer of architecture 100 includes a power cap distribution system 110 that is communicably coupled to the HPC system and nodes 122a-n (collectively referred to herein as compute nodes 122) and nodes 124a-n (collectively referred to herein as system nodes 124) via a communication interface 140. Communication interface 140 may be a physical wired connection and/or a wireless communication network (e.g., a WLAN, VLAN, or the like).

The nodes 122 and 124 may collectively constitute an HPC system 120 for executing one or more workloads or jobs by clustering the compute nodes for performing a distributed computation. The HPC system may comprise a fabric interconnect (e.g., wireless or wired connections) that connects the nodes 122 and 124 into a networked configuration for performing distributed computations. The nodes 122 may comprise controllable compute nodes 122, which are examples of system equipment providing hardware resources for performing computations. Compute nodes may be implemented as CPUs, GPUs, accelerators, and the like. In one example, the HPC system 120 may be a homogenous system in which compute nodes 122 consists of nodes of the same architecture (e.g., same type). In another example, HPC system 120 may be a heterogenous system in which compute nodes 122 consist of a number of dissimilar or different architectures (e.g., different compute node types, such as shown in Table 1 as an example). Compute nodes 122 may comprise heterogenous subsets of compute nodes, where each subset of compute nodes may be homogenous across the subset.

Nodes 124 may comprise non-controllable system nodes, which are examples of system equipment providing hardware resources having fixed power cap values. Nodes 124 may include support infrastructure (e.g., power distribution, system cooling, etc.) and system components that either cannot be, should not be, or designated as not to be controlled, such as, but not limited to, login nodes, network equipment, system management controllers, input/output (I/O) subsystem etc. System nodes 124 may be include switches, PDUs, controllers, cooling system, etc.

While FIG. 1 and the description herein in connection with FIGS. 1-7 is provided with reference to nodes 122 and 124 as examples of system equipment, the technology disclosed herein is not so limited. A piece of system equipment may be embodied as system of a number of systems collectively providing for an HPC system, a compute node of an HPC system, system nodes of an HPC system, a compute unit, device, or component that makes up a node (e.g., compute or system node), or any component on the HPC system that consumers power.

The architecture 100 includes power cap distribution system 110 that communicates with HPC system 120 and nodes 122 and 124. Power cap distribution system 110 may reside on a public network, private network, or hybrid network. The power cap distribution system 110 comprises a controller 115, a power cap interface 116, an inventory interface 118, and a storage 114. Power cap distribution system 110 may be implemented as a server running on the public network, private network, or hybrid network. A public network may share publicly available resources/services over, e.g., the Internet, while a private network may not be shared and may only offer resources/services over a private data network. A hybrid network may share services between public and private clouds depending on the purpose of the services. Power cap distribution system 110 may be cloud-based, which would be understood by those of ordinary skill in the art to refer to being, e.g., remotely hosted on a system/servers in a network (rather than being hosted on local servers/computers) and remotely accessible. Such a cloud-based system allows the system to be accessible from a variety of places, not just where the system is hosted (e.g., an OOB system). Thus, an end-user, using a mobile device or personal computer as front-end system 130 may have access to a power cap distribution system 110. It should be noted that the power cap distribution system 110 need not reside on the same network in which compute nodes 122 are distributed on.

Power cap distribution system 110 and nodes 122 and 124 may communicate under various circumstances. For example, power cap distribution system 110 may include a device gateway 117 comprising the power cap interface 116 and the inventory interface 118 and an application programming interface (API) receiver 112. Device gateway 117 may be a mechanism/interface implemented as APIs for communicating with HPC system 120 and nodes 122 and 124, while API receiver 112 may interface with the aforementioned front-end system 130, which may provide access to a dashboard 132. The dashboard 132 may be hosted by the power cap distribution system 110 accessed via a web portal or hosted locally on the front-end system 130. End-users may enter inputs via dashboard 132, which power cap distribution system 110 may receive inputs from front-end system 130, and power cap distribution system 110 may provide information or data on HPC system 120 and/or nodes 122 and 124 to the front-end system 130.

Power cap distribution system 110 may request an inventory of HPC system resources (e.g. inventory of nodes 122 and/or 124) through an inventory interface 118. The HPC system 120 may respond with information and data of the various nodes 122 and 124 (e.g., architectures, identifiers, etc.) that power cap distribution system 110 stores as inventory information in storage 114. In an example implementation, inventory interface 118 issues a code call (e.g., GET command) to HPC system 120 to retrieve a listing of nodes 122 and/or 124. In turn, the HPC system 120 transmits inventory information to the controller 115 via the inventory interface 118. From the inventory information, a count of the total number of compute nodes 122 and unique identifiers of compute nodes 122 (e.g., IP address, MAC address, or the like) can be obtained. Similarly, a count of the total number of system nodes 124 and unique identifiers of system nodes 124 can be obtained. The inventory may include a number of unique model or type identifiers (e.g., SKUs or other identifier that distinguish between unique product models) distinguishing between compute node types and a number of compute nodes for each type.

Power cap distribution system 110 may also request power cap information of the HPC system resources (e.g. power cap information of compute nodes 122) through power cap interface 116 and store power cap information returned in storage 114. In an example implementation, power cap interface 116 issues a code call (e.g., GET command) to HPC system to retrieve hardware defined power caps of the node types on the HPC system 120. For example, the power cap interface 116 packages the unique model or type identifiers with into a code call (e.g., GET command) for power caps for identified compute node types and system node types. In turn, the HPC system 120 transmits power cap information to the controller 115 via the power cap interface 116. The power cap information may include power cap values (e.g., in the case of non-controllable system nodes 124) and minimum and maximum power caps for each compute node type as defined by the hardware architecture of the compute node types. In some examples, the power cap information may include a power cap delta (e.g., difference between the maximum and minimum power cap) that defines a power cap range for each compute node type. In another example, the power cap range (or delta) can be determined from the minimum and maximum power caps. Power caps for each compute node type (or system node type) can be different from power caps of other compute nodes (or other system nodes). The returned power caps may be associated with the unique model or type identifier of the corresponding compute node type and/or system node.

The power cap distribution system 110 may receive power cap information as inputs at a front-end system 130, for example, by an end-used (such as owner, administrator, or operator of the HPC system), specifying a power budget. The end-user can also input a system-wide power cap or the system-wide power cap can be derived from the power budget (e.g., from Equation 1 above). The power cap information may define a maximum power budget and/or maximum power cap specified by the end-user.

Power cap distribution system 110 may comprise, be communicatively coupled with, or otherwise have access to storage 114. In an example implementation, storage 114 may be implemented as, for example, one or more database(s). For example, power cap distribution system 110 may comprise one or more database servers which manage storage 114. Power cap distribution system 110 may submit data to be stored in storage 114, and/or request access to data stored in storage 114. Any suitable database may be utilized, including without limitation MySQL™, Oracle™, IBM™, Microsoft SQL™ Sybase™, Access™, and the like, including cloud-based database instances and proprietary databases. In another example, storage 114 may be implemented as random access memory (RAM) or other dynamic memory or non-transitory storage medium that can be used for storing information and instructions to be executed by a hardware processor. In some examples, storage 114 (or a portion of storage 114) may also be implemented as a read only memory ("ROM") or other static storage device.

Figure 2:
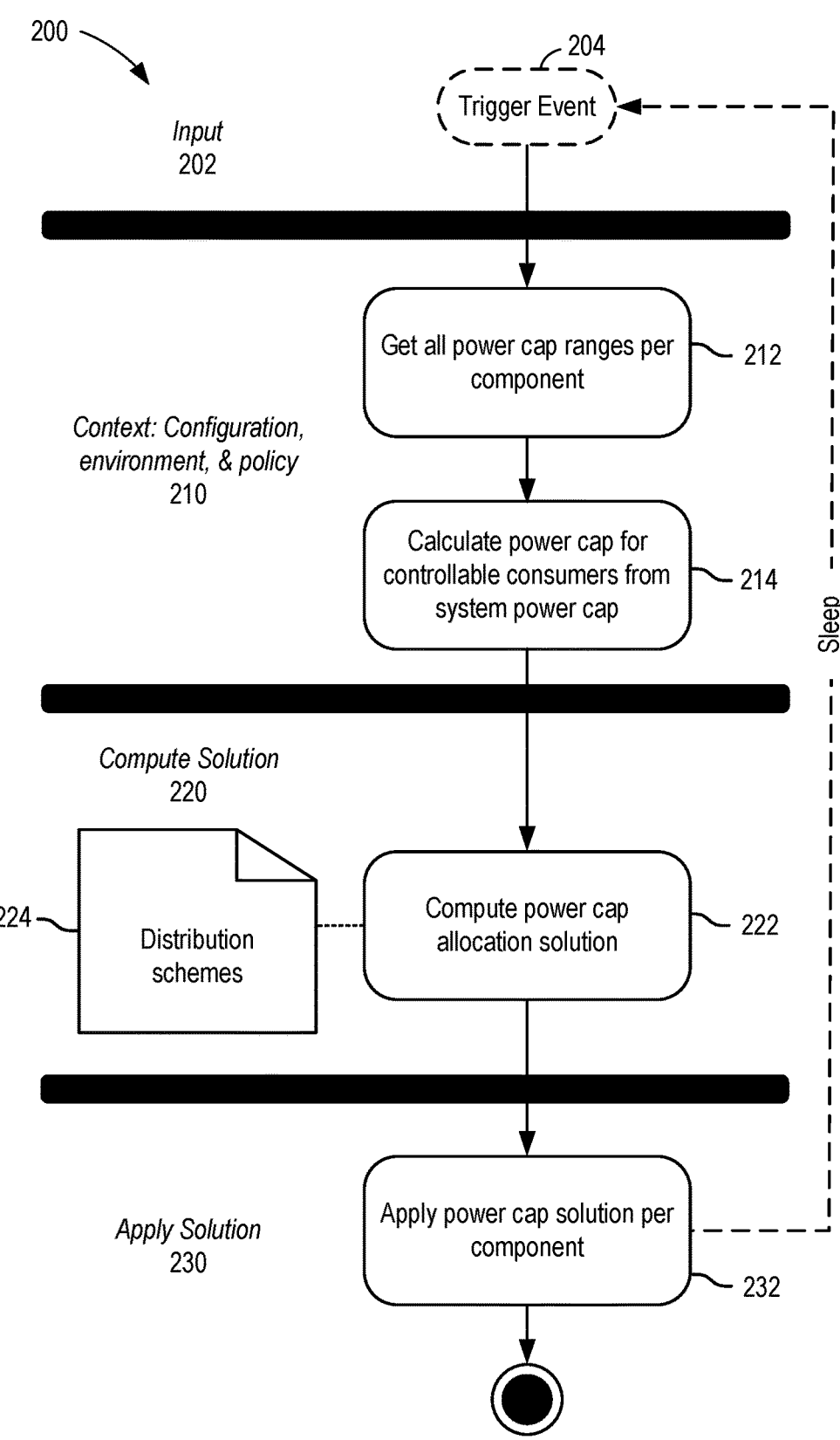
FIG. 2 is a flow diagram of an example process for distributing a system power cap to computes nodes of a HPC system in accordance with implementations disclosed herein.

FIG. 2 is a flow diagram of an example process 200 for distributing a system power cap to computes nodes of a HPC system in accordance with implementations disclosed herein. Process 200 may be implemented as instructions, for example, stored in a memory, that when executed by one or more processors perform one or more operations of process 200. For example, process 200 may be performed by power cap distribution system 110 of FIG. 1, such as for example, by controller 115 in communication with front-end system 130 and compute nodes 122.

Process 200 can be divided into multiple phases, such as an input phase 202, a context definition phase 210, a computation phase 220, and an application phase 230. During the input phase 202, process 200 receives inputs defining requested system power caps and/or power budgets, distribution policies and the like, for example, from an end-user via front-end system 130. During the context definition phase 210, process 200 determines an execution context, such as a system-wide software configuration (e.g., configuration of the algorithm shown in process 200), distribution policies of the system (e.g., policies set by end users for executing the process 200), and current environment (e.g., configuration of current system, such as number of compute and/or system nodes, power cap ranges and/or values, current power consumption by each node, etc.). Process 200 execute the computation phase 220 to allocate power caps to compute nodes according to the requested power cap, and during application phase 230 the allocated power caps as provided to the HPC system for application to the compute nodes.

Through execution of the phases of process 200, implementations disclosed herein are able to determine an optimal node power cap distribution for either homogenous or heterogeneous HPC systems comprising homogenous and/or heterogeneous node architectures according to a user definable policies and extensible distribution schemes. That is, process 200 can be executed to determine power caps for each compute node in an HPC system, regardless of whether the HPC system is homogenous or heterogeneous, such that a system-wide power cap is optimally distributed amongst the compute nodes of the HPC system. The process 200 can then issues instructions to the HPC system to apply the determined power caps to each individual compute node of the HPC system. Process 200 can be performed OOB and then provided as instructions to an in-band application aware power and energy management software for execution therein, in combination with hardware provided power control interfaces and hardware-based node power distribution logic (e.g., static and dynamic), to set optimal node power guardrails according to a system-wide power cap and application power requirements. An example of aware power and energy management software is provided in U.S. application Ser. No. 17/337,107, the disclosure of which is incorporated herein by reference in its entirety The in-band application aware power and energy management software may reside on the HPC system.

In operation, process 200 receives a Requested_Power-_Cap as an input during the input phase 202. In an example implementation, an end-user may specific a power budget for an HPC system (e.g., via front-end system 130 of FIG. 1). From the specified power budget, a Requested_Power-_Cap for the controllable compute nodes on the HPC system can be determined (e.g., from Equation 1). In another example, a Requested_Power_Cap for the controllable compute nodes can be specified by an end-user. In some implementations, the input may optionally include a designation of compute nodes to be targeted by the process 200. That is, for example, the optional designation of compute nodes to target may tag designated compute nodes as controllable, while remaining nodes are designated as non-controllable. If the optional designation is not used, then default configurations of controllable and non-controllable will be in place.

During the context definition phase 210, the power cap distribution system 110 may obtain an inventory of compute nodes 122 and system nodes 124 on the HPC system via the inventory interface 118. Inventory information may include a count of the total number of compute nodes and unique identifiers of compute nodes 122, along with numbers and identifiers of system nodes 124. The inventory may include a number of unique model or type identifiers distinguishing between node types and a number of nodes for each type. The inventory may include configuration information that identifies system equipment and components (such as network switches, login nodes, compute nodes) as either controllable or non-controllable power consumers. In the case where compute nodes to target are designated in the input phase 202, the designated compute nodes may be set as controllable compute nodes, while other compute nodes are set as non-controllable.

As operation 212, power cap ranges are obtained for each compute node and/system node type can be identified in the inventory information. For example, power cap distribution system 110 may obtain hardware defined power cap information of each node type through power cap interface 116. As described above, the power cap information may include minimum and maximum power caps for compute nodes 122 as set according to the hardware architecture for each compute node type. Additionally, the power cap information may include a power cap delta that represents a power cap range between the minimum and maximum power caps for each compute node type. In another example, the power cap delta can be determined from the minimum and maximum power caps. The power cap information may also include power cap values for system nodes 124 as set according to the hardware architecture for each node type.

At operation 214, a power cap for the controllable compute nodes can be calculated from the Requested_Power-_Cap received during input phase 202. In an example implementation, a system-wide power cap for the controllable compute nodes can be calculated based on the Requested_Power_Cap compared to an effective settable range of power caps. For example, if the Requested_Power_Cap exceeds or is equal to the effective settable range of power caps, the system-wide power cap for the controllable compute nodes can be set to an upper bound (e.g., maximum) of effective settable range of power caps. If the Requested_Power_Cap is less than a lower bound of the effective settable range of power caps (e.g., a minimum), then an error can be returned as the a solution is not possible, the Requested_Power_Cap can be to lower bound, and/or controllable compute nodes can be deactivated to provide for the Requested_Power_Cap (referred to herein as starvation). Otherwise, the Requested_Power_Cap can be set as the system-wide power cap for the controllable compute nodes, from which individual power caps for each controllable compute node can be calculated as described herein.

In an illustrative example, the effective settable range of power caps can be derived from power caps of all the compute nodes on the HPC system. For example, a sum of minimum power caps for all compute nodes on the HPC system (Sum_Min) can be determined using minimum power caps of each compute node type multiplied by the number of compute nodes of a respective type. Similarly, a sum of maximum power caps for all compute nodes (Sum-_Max) can be determined using the maximum power caps of each compute node type multiplied by the number of compute nodes of a respective type. The effective settable range of power caps can then be defined as the range between the Sum_Min and the Sum_Max. As such, if the Requested-_Power_Cap exceeds or is equal to Sum_Max, then the Requested_Power_Cap is set to the maximum and all controllable compute nodes can be set to the maximum power cap. If the Requested_Power_Cap is below Sum_Min, then an error can be returned, the Requested_Power_Cap set to Sum_Min and controllable compute nodes set to minimum power cap, and/or controllable compute nodes can be deactivated to reach the Requested_Power_Cap (e.g., starvation). Otherwise, the Requested_Power_Cap can be set as the system-wide power cap from which individual power caps for each controllable compute node can be calculated.

Figure 3:
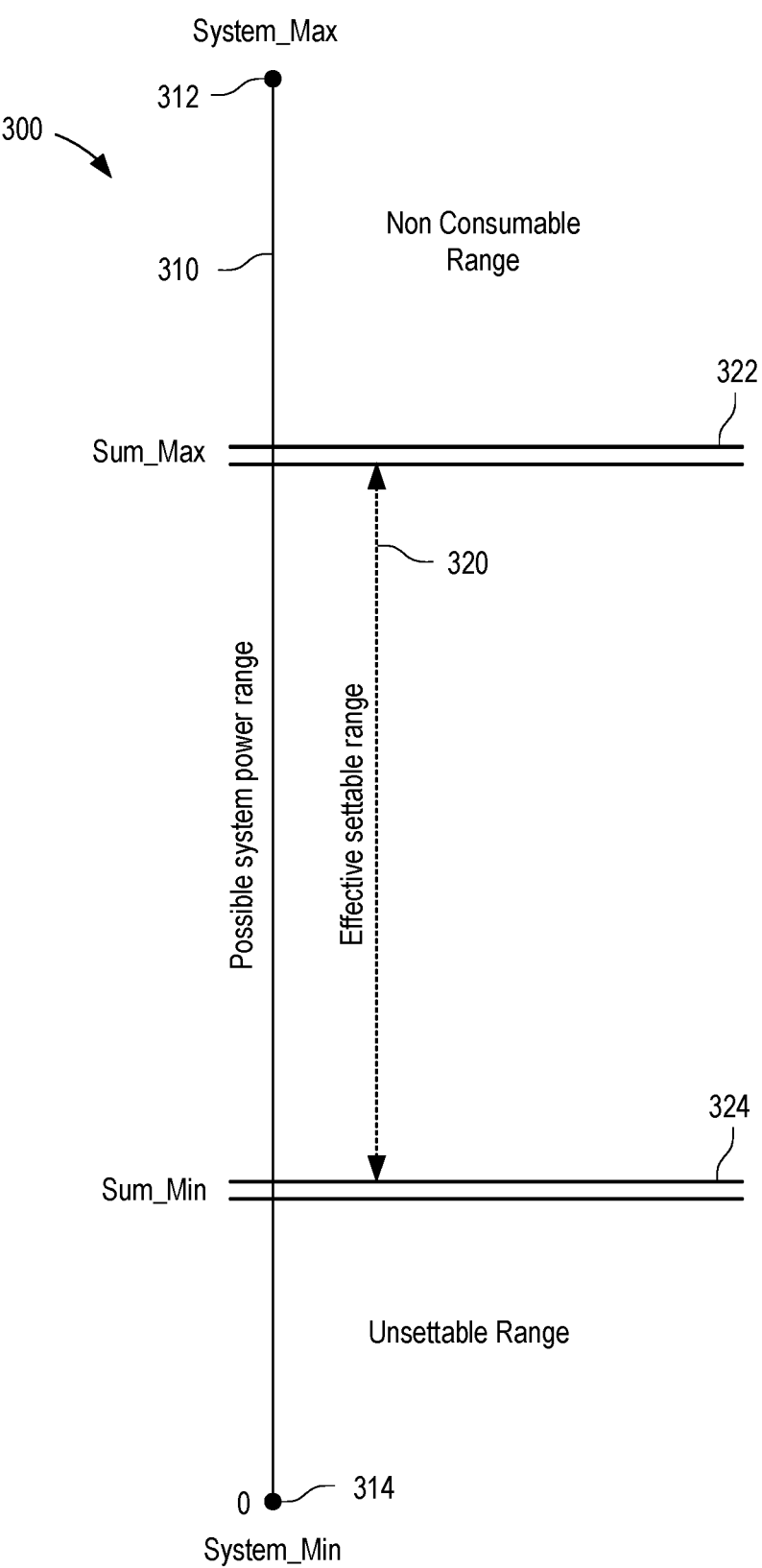
FIG. 3 illustrates a schematic diagram of a decision graph for determining a system-wide power cap for the controllable compute nodes according to an example implementation.

FIG. 3 illustrates a schematic diagram of a decision graph 300 for determining a system-wide power cap for the controllable compute nodes according to an example implementation. Decision graph 300 schematically illustrates at least a portion of operation 214 for computing a power cap for the controllable compute nodes from the Requested-_Power_Cap in comparison with an effective settable range of power caps.

Decision graph 300 shows a range of all possible system power caps 310. The range of possible system power caps 310 spans a system minimum power consumption (System-_Min) 314 (e.g., zero Watts) to a system maximum power consumption (System_Max) 312, and includes all possible amounts of power consumption therebetween. The System-_Max 312 may be determined according to Eq. 1. For example, System_Max 312 can be determined as a sum of all maximum power cap values of controllable compute nodes and all power cap values of non-controllable system nodes. Decision graph 300 also depicts Sum_Max 322 and Sum_Min 324 as described above, which define an effective settable range 320. Above the Sum_Max 322 (e.g., upper bound of the effective settable range 320) is a non consumable range and below the Sum_Min 324 (e.g., lower bound of effective settable range 320) is a unsettable range. As described above, if the Requested_Power_Cap is equal to or above Sum_Max 322 (e.g., within the non consumable range), the power cap for the controllable compute nodes can be set to the Sum_Max 322. In some scenarios, it may be possible that System_Max 312 is less than the Sum_Max 322, in which case System_Max 312 may become the upper bound of the effective settable range 320. Further, as described above, if the Requested_Power_Cap is less than Sum_Min 324 (e.g., within the unsettable range), then the requested power cap cannot be supported by the controllable nodes. In this case, an error may be returned to front-end system 130 indicating that the requested power cap is not available without reducing the number of controllable compute nodes or deactivating a number of compute nodes to lower the Sum_Min 324 (e.g., starvation). Otherwise, if the Requested_Power_Cap is equal to or greater than Sum_Min 324 or less than Sum_Max 322, then the Requested_Pow-er_Cap is set as the power cap for the controllable compute nodes and can be used downstream to compute individual power caps for each controllable compute node.

Returning to FIG. 2, at operation 222, a power cap allocation solution for the controllable compute nodes can be computed based on the results from operation 214 and application of a distribution scheme. For example, where a power cap can be set as described above in operation 214 (and with reference to FIG. 3), power cap distribution for each controllable compute node can be computed that allo-cates a power cap value to each controllable compute node. The distribution of the power cap amongst the controllable compute nodes can be determined using a distribution scheme. The distribution scheme according to various implementations calculates power cap allocations for the controllable compute nodes by determining an amount to increment a power cap of each controllable compute node until the system power usage, when operated at the highest allowable power usage, meets the Requested_Power_Cap. The present disclosure provides a non-exhaustive list of example distribution schemes that can be employed by process 200, such as "even_split"; "equal_pertantage"; "count_down"; and "delete_by_delta". While each are dif-ferent schemes or algorithms, each one determines an incre-ment step (which can be the same or dissimilar among the different compute node types) to apply to the power cap of the controllable compute nodes based, in part, on the power cap ranges of each controllable compute node type.

The distribution schemes can be stored as executable instructions in distribution scheme file 224. The distribution scheme file 224 can be accessed by operation 222 according to a distribution policy set in context definition phase 210 based on input from an end-user, for example, via front-end system 130. That is, operation 222 can access distribution scheme file 224 and execute one or more distribution schemes stored therein to allocate power caps to controllable compute nodes. Executing a distribution scheme includes computing an increment step in power caps that can be allocated to each controllable compute node such that the power cap determined in operation 214 can be optimally distributed amongst the controllable compute nodes accord-ing to the distribution policy. In various examples, each type of controllable compute node can be allocated a power cap that is applied to all controllable compute nodes of a respective type. Thus, while power caps between different compute node types are different, the power caps across a compute node type may be the same.

Figure 4:
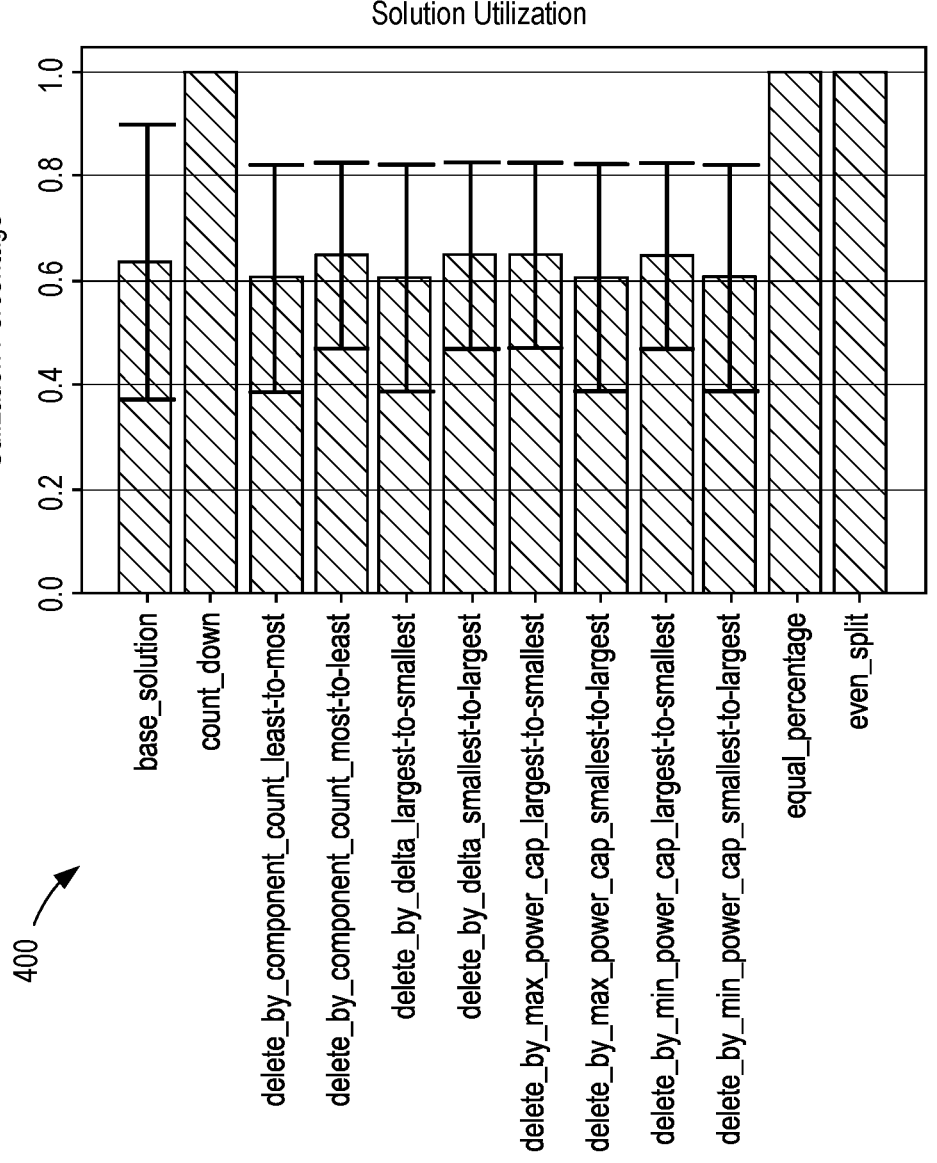
FIG. 4 is a bar graph showing total power utilization of various distribution schemes for allocating a power caps to controllable compute nodes in accordance with an example implementation.

According to implementations disclosed herein, a number of distribution schemes can be utilized and an optimal scheme selected therefrom. For example, different power cap allocations can be calculated using different distribution schemes, and an optimal distribution can be selected that provides the best total power utilization (as shown in FIG. 4 below) relative to total power utilization of the other distribution schemes. Total power utilization can be defined according to the end-user power management goal (e.g., a tradeoff between efficiency in power consumption and per-formance in time to solution), the end-user distribution policy (e.g., prioritizing high power consuming compute nodes over low power consuming compute nodes), and the nature of the hardware (e.g., provide more power to better utilized compute node architectures). In an example imple-mentation, total power utilization can be a measure of how close a sum of the allocated power caps come to the Requested_Power_Cap without exceeding the Requested-_Power_Cap. This definition of total power utilization provides for maximum advantage of the Requested_Power-_Cap.

As alluded to above, example distribution schemes include, but are not limited to, "even_split" scheme; "equal_pertantage" scheme; "count_down" scheme; and "delete_by_delta" schemes, each of which will be described in detail below. While each are different schemes for distributing the Requested_Power_Cap, each one determines an increment step (or allocation) that can be applied to power caps of the controllable compute nodes based, in part, on the power cap ranges of each controllable compute node type. While the present disclosure provides for certain example distribution schemes, implementations disclosed herein are not limited to only these example schemes. Any distribution scheme may be utilized as desired for a given application. Thus, the present disclosure provides for simulating and evaluating different system power distribution schemes, which allows for customization of a system power management solutions according to end-user requirements.

Turning to the example distribution schemes. One example is the even_split scheme, which takes the difference between the Requested_Power_Cap and Sum_Min and divides this difference evenly among all controllable compute nodes. For example, the number of controllable compute nodes in the HPC system can be identified, and a Sum_Min determined as set forth above. The difference between Requested_Power_Cap and Sum_Min can be calculated and divided by the number of controllable compute nodes. The resulting value is allocated to each controllable compute node as the power cap for a respective controllable compute node. This scheme may be optimal in the case where there is overlap in power cap ranges of the controllable compute nodes or that the HPC system is homogenous.

Another example distribution scheme is the equal_percentage scheme. In this scheme, a power cap delta (or range) is calculated for each controllable compute node and the power cap delta is split into n-discrete steps. In one example, n-discrete steps may be 10,000 discrete steps, however any number of steps may be used as desired. Starting from a maximum power cap for each controllable compute node, this scheme decrements a power cap for each controllable compute node until the sum of the power caps across all controllable compute nodes is less than or equal to the Requested_Power_Cap. In some implementations, the discrete steps may be result in power cap values that have a decimal. In this case, the power cap values can be truncated to an integer, which may be required for the hardware settings. This is because, hardware implementations may only allow for whole wattage settings (e.g., in increments of one). 10,000 discrete steps, also referred to as a 'decrease quantum' was chosen to in this example ensure a high enough resolution such that all discrete steps for all controllable compute nodes types would be not be larger than 1 W. If the decrease quantum is larger than 1 W (e.g., decrease by 2 W) the solution may not be able to consume total available watts (e.g., may not optimally use all of the Requested_Power_Cap).

Another example distribution scheme is the count_down scheme. In this scheme, power cap values for each controllable compute node is decreased by a wattage amount from Max power cap until the sum of the power caps is less than or equal to Requested_Power_Cap. In an example implementation, the wattage amount is 1 W or an integer of watts, due to requirements in hardware settings of integer wattages.

The count_down scheme is similar to equal_percentage scheme, but instead of all compute node types having an equal number of discrete steps, each compute node type has different numbers of available steps, such that compute node types with smaller power cap deltas may reach a minimum power cap, as defined by hardware architecture, before those with larger ranges. For example, with reference to Table 1 above, note type 1 with a delta of 575 W may be exhausted (e.g., set to minimum power cap) before a node type 2 with a delta of 1990 W.

A further example distribution scheme is a delete_by_delta scheme. In this scheme, the controllable compute nodes are separated into groups based on a difference (e.g., delta) between the minimum power cap and maximum power cap. As a result, controllable compute nodes with identical power cap deltas in placed into the same group. For each group, the range between the minimum and maximum power cap values are calculate and power cap values for all controllable compute nodes are set to maximum power cap. Then, starting with a group of controllable compute nodes having the smallest delta, power caps of the entire group are set to the minimum power cap value. After setting the group, the sum of all controllable compute nodes are computed and a determination is made as to whether or not the sum of the power cap values is less than or equal to Requested_Power_Cap. If the sum is larger than the Requested_Power_Cap, the scheme continues to the next group in line (e.g., the next smallest delta). The scheme repeats until the sum of the power cap values is less than or equal to Requested_Power_Cap.

The delete_by_delta scheme is reversible, in that instead of processing groups according to smallest delta (referred to as delete_by_delta_smallest-to-largest), groups can be processed according to largest delta so to remove the largest delta groups first and moving to the group having a next largest delta (referred to as delete_by_detal_largest-to-smallest). This scheme aims to keep the largest (or smallest in the reversed case) range of power caps at maximum power, which would bias the system to prioritize supplying power to compute nodes with a larger (or smaller) power cap range.

Other variations of the delete_by_delta are possible. For example, but are not limited to, delete_by_component_count_least-to-most (e.g., grouping controllable compute nodes according to number of compute nodes for each type and setting the power caps of the group having the least number of compute nodes to minimum power cap values first, then moving to the next group); delete_by_component_count_most-to-least (e.g., the reverse of the delete_by_component_count_least-to-most); delete_by_max_power_cap_largest-to-smallest (e.g., grouping controllable compute nodes according to max power cap value and setting the power caps of the group having the largest maximum power cap value to minimum power cap values first, then moving to the next group); delete_by_max_power_cap_largest-to-smallest (e.g., the reverse of the delete_by_max_power_cap_smallest-to-largest); delete_by_min_power_cap_largest-to-smallest (e.g., grouping controllable compute nodes according to min power cap value and setting the power caps of the group having the largest min power cap value to minimum power cap values first, then moving to the next group); delete_by_min_power_cap_largest-to-smallest reverse (e.g., the of the delete_by_min_power_cap_smallest-to-largest); among others.

FIG. 4 is a bar graph showing total power utilization of various distribution schemes for allocating a power caps to controllable compute nodes in accordance with an example implementation. Multiple distribution schemes were simulated at operation 222 to compute power cap allocations that distribute a system-wide power cap to controllable compute nodes, and the bar graph of FIG. 4 provides a visual comparison for evaluating performance of each distribution scheme. Base_solution refers to setting power caps for each controllable compute node to its corresponding maximum power cap, and, if maximum setting is not possible, setting power caps for each controllable compute node to its corresponding minimum power cap.

In the example implementation of FIG. 4, the simulations used the compute node profiles shown in Table 1 above. To generate FIG. 4, a series of tests were executed across the range of system power cap limits (e.g., Sum_Min to Sum_Max), from just below the minimum valid power cap solution (e.g., all nodes set to min, aka Sum_Min) to just above the maximum valid power cap solution (all nodes set to max, aka Sum_Max). The tests were split into whole percentages leading to 70 separate tests cases (e.g., 70 unique possible Requested_Power_Cap values). Then, each scheme was executed using the 70 test cases and the per scheme solution utilization (e.g., per test case) was determined. For each scheme, a mean, a standard deviation (STDDEV), and a variance across the population of total power utilization for each test case was calculated. FIG. 4 illustrates the mean and standard deviation, while mean, standard deviation, and variance are shown in Table 2 below. A mean demonstrates how effective a given scheme was across all test cases, where a score of 1.0 would mean that the scheme allocated 100% of the Requested_Power_Cap. The standard deviation is the spread of the solution utilizations from the mean and the variance measures the average degree to which each solution utilization varies from the mean. For both standard deviation and variance, a lower value indicates better performance.

TABLE 2

| Distribution Scheme | Utilization Mean | Utilization STDDEV | Utilization Variance |
|---|---|---|---|
| Base_solution | 6.35E−01 | 2.64E−01 | 6.97E−02 |
| Count_down | 1.00E+00 | 2.04E−04 | 4.18E−08 |
| Delete_by_delta_largest-to_smallest | 6.02E−01 | 2.17E−01 | 4.73E−02 |
| Delete_by_delta_smallest-to_largest | 6.49E−01 | 1.78E−01 | 3.17E−02 |
| Equal_percentage | 1.00E+00 | 2.71E−04 | 7.37E−08 |
| Even_split | 9.99E−01 | 3.4E−04 | 1.74E−01 |

As can be seen from Table 2 and FIG. 4, the equal_percentage scheme and count_down scheme provide the most optimal (e.g., efficient in terms of power meeting the Requested_Power_Cap) power utilization. Even though both distribution schemes provide almost the same utilization of the available power, they have different application performance implications. For example, the equal_percentage distribution scheme may provide for a more even performance reduction across all controllable compute node types since the power reduction is based on the same percentage from the maximum power cap value. Whereas the count_down scheme reduces the power by a fixed quantity independent of the maximum power cap. Thus, the count_down scheme will exhaust a compute node having a smaller power cap delta (e.g., Node Type 1 in Table 1) before those of larger power cap deltas (e.g., Node Type 2 in Table 1) by setting the compute nodes to minimum performance earlier than in the equal_percentage distribution scheme.

Therefore count_down scheme may favor compute nodes types having larger power cap deltas. Alternatively, equal_percentage scheme may ensure that all compute node types will have at least some power above minimum, as long as system power cap is greater than Sum_Min. Furthermore, while the foregoing provided for optimization for maximum solution utilization, it is possible that sites may optimize for different criteria, such as providing maximum power to compute nodes with accelerators versus nodes with CPUs only.

Referring back to FIG. 2, once the power cap allocation is computed in operation 222, process 200 proceeds to 232 where the power cap distribution solution is applied to the controllable compute nodes. For example, the power cap values allocated according to a distribution scheme in operation 222 can be communicated to the HPC system, and the power cap values can be set in the hardware of each compute node. As noted above, in the case where a list of target compute nodes was identified in the input phase 202, the distribution scheme allocates power caps for those target compute computes (e.g., setting all other nodes a non-controllable) and sets the power caps accordingly. In an example implementation with reference to FIG. 1, controller 115 can execute process 200 and interface with HPC system 120 to transmit a message packaged within instructions to apply power caps to each controllable compute 122 via power cap interface 116. The HPC system 120 can then forward instructions to the controllable compute nodes, each of which unpackage the instructions and set their respective power caps according to the instructions from controller 115. Thus, each compute node 122 can be controlled to set its own power cap according to instructions received from controller 115. As a result, the HPC system can then operate such that the system-wide power usage does not to exceed the Requested_Power_Cap due to power caps set within the controllable compute nodes, while efficiently utilizing the power available so to meet the Requested_Power_Cap without exceeding Requested_Power_Cap.

According to various implementations, process 200 can be applied to a whole HPC data center recursively down to individual systems, recursively down to an individual compute node, e.g., individual accelerators (e.g., compute units) can be power capped. Each hierarchical level can be considered a system that can be broken down into nodes that represents a power consumers (e.g., non-controllable consumers and controllable consumers). Therefore, solutions for one level have the potential of being applied recursively to other levels of the power management hierarchy, as shown in Equations 2-4. For example, Equation 2 below shows a first level (facility power) that can comprise a plurality of systems consuming power. The plurality of systems at this level may be considered compute nodes, which can include controllable and non-controllable consumers. At the next level (e.g., Equation 3), a system of the facility from Equation 2 can comprise a plurality of compute nodes, which can include controllable and non-controllable consumers. Drilling down to the next level (e.g., Equation 4), a given compute node of the system from Equation 3 can comprise a plurality of compute units (or components). The plurality of compute units at this level can include controllable and non-controllable power consuming components.

$$\text{Facility Power} = \quad \text{Eq. 2}$$

$$\sum\nolimits_{i=1}^{C} \text{noncontrollable consumers}_{Max\,Power} + \sum\nolimits_{j=1}^{S} \text{System Power}$$

$$\text{System Power} = \sum\nolimits_{i=1}^{C} \text{noncontrollable consumers}_{Max\,Power} + \quad \text{Eq. 3}$$

$$\sum\nolimits_{j=1}^{N} \text{Compute Node Power}$$

$$\text{Compute Node Power} = \quad \text{Eq. 4}$$

$$\sum\nolimits_{i=1}^{C} \text{noncontrollable consumers}_{Max\,Power} + \sum\nolimits_{j=1}^{C} \text{Compute Unit}$$

Accordingly, implementations disclosed herein can be utilized by end-user to specify a system-wide power cap from which individual power caps for compute nodes on the system can be determined and optimized according to a distribution scheme. For a specific system-wide power cap, multiple distribution solutions can be simulated based on different distribution schemes. The simulated distributions can then be evaluated based on solution utilization that can be defined according to an end-user distribution policy. The best fit (e.g., optimal resource usage according to the end-user distribution policy) distribution can be automatically applied to all controllable compute nodes of the system based on compute node type.

According to various implementations, compute node power caps can be set via OOB execution of the examples disclosed herein. These compute node power caps can become guard rails and starting set-points if an application aware in-band component is available. A combination of OOB control and in-band application awareness could be used to, for example, manage compute node power caps according to running application needs. For example, an application may need only two GPUs from a set of four to perform a job, and shift power from those nodes of the job to other nodes in the system.

Process 200 may also be automated responsive to detecting an occurrence of a trigger event. For example, process 200 may optionally include detecting one or more trigger events at operation 204 that can trigger execution of process 200. Operation 204 may be optional as indicated by the dashed lines. The trigger event can be a system events, such as initiating of job or workload; receipt of a requested power cap or power budget, such as an update to a previously inputted requested power cap/power budget; period of time, such as detected by a timer. In the case of timer, which may be included in a controller 115 for example, a period of time may be set in advance that defines an interval between repeated executions of process 200.

Operation 204 can also include obtaining inputs of input phase 202, such as requested system power caps and/or power budgets, distribution policies, and the like. In one example, receipt of one or more end-user inputs may function as a trigger event. For example, an end-user may input a requested system power cap (e.g., Requested_Power_Cap described above) and/or a power budget that triggers execution process 200 according to the input. In some examples, the input may be an updated system power cap or power budget that triggers a re-optimization of the power cap allocation.

Where a detected trigger event is based on passage of a period of time, job/workload, or otherwise not based on updating end-user inputs, the input phase 202 may include obtaining previously stored power budget and/or requested power caps (e.g., stored in storage 114) for use in process 200.

Figure 5:
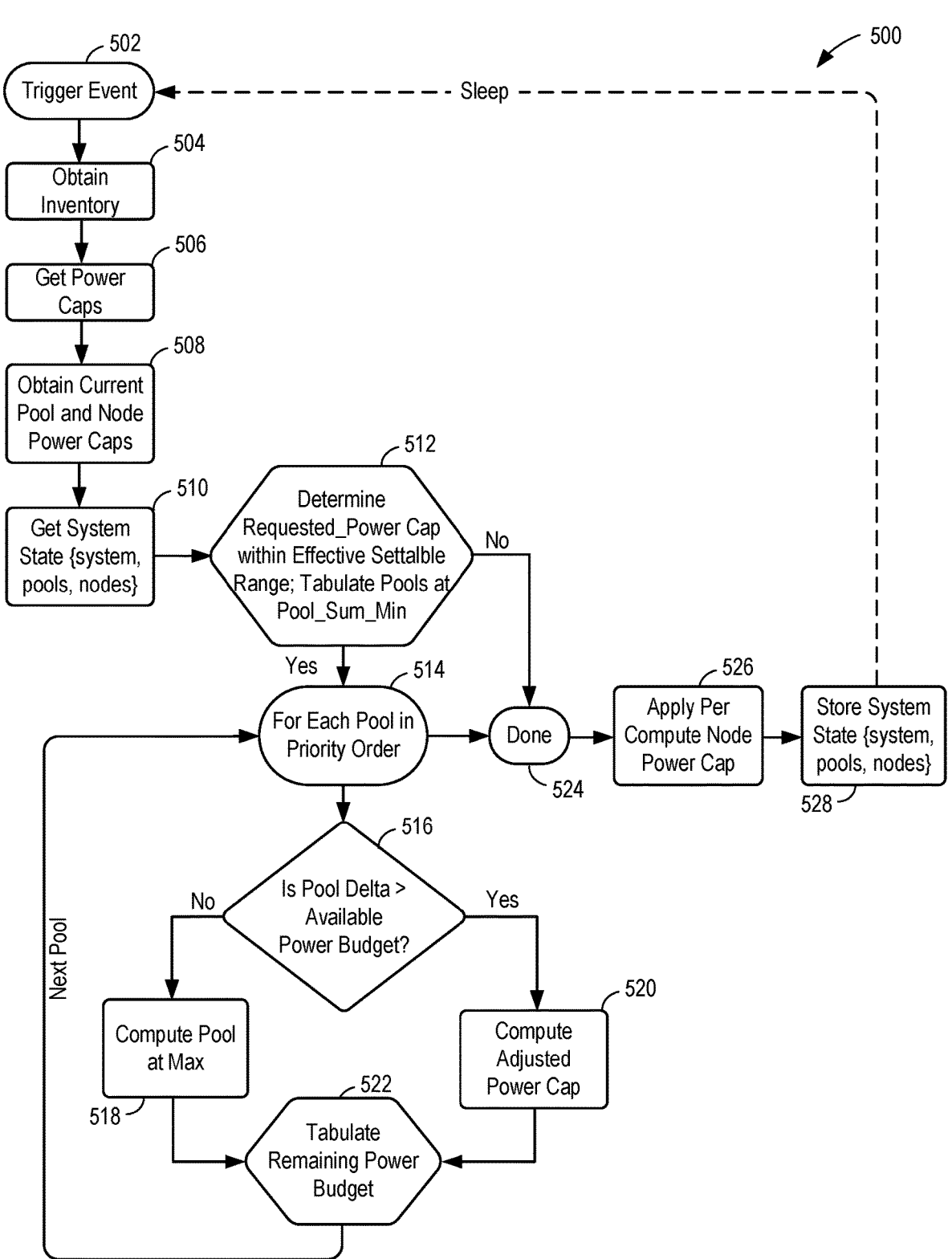
FIG. 5 is a flow diagram of an example process for distributing a system power cap to pools of computes nodes of a HPC system in accordance with implementations disclosed herein.

FIG. 5 is a flow diagram of an example process 500 for distributing a system power cap to pools of computes nodes of a HPC system in accordance with implementations disclosed herein. Process 500 may be implemented as instructions, for example, stored in a memory, that when executed by one or more processors perform one or more operations of process 500. For example, process 500 may be performed by power cap distribution system 110 of FIG. 1, such as for example, by controller 115 in communication with front-end system 130 and compute nodes 122. The process described herein with reference to FIG. 5 is not limited to the particularly illustrated sequence, and the operations related thereto can be performed in other sequences that are appropriate, or may be performed in parallel, or in some other manner.

In this example, an HPC system, such as HPC system 120, comprises a plurality of controllable compute nodes (e.g., compute nodes 122) and non-controllable system nodes (system nodes 124). The nodes 122 and/or 124 can be clustered into pools of nodes, where each pool may comprise one or more compute nodes 122 and/or one or more system nodes 124. Each pool may comprise an arbitrary number of nodes. The configuration of each pool may be defined by the end-user during a system startup. In some implementations, nodes 122 and/or 124 may be clustered based on a job or workload. For example, a given pool may be defined to include nodes 122 and/or 124 for completing a job or workload. As another example, a group of pools may be defined for completing a job or workload, where each pool is designated a computational task of the job or workload. In another example, nodes 122 and/or 124 may be clustered based on geographical proximity. For example, a distributed HPC system may be located at various datacenters with different geographic locations. Each pool may comprise those nodes that are geographically co-located. In another example, pools may be defined based on node type and/or controllability. For example, pools may be set so to comprise nodes of the same node architecture (e.g., homogenous pools). As another example, a given pool may comprise only controllable compute nodes, while another pool may comprise only non-controllable system nodes. In yet another example, a pool may be created that includes nodes that are not to be managed (e.g., a "no manage" pool). In this case, controllable compute nodes 122 may be assigned to a no manage pool and treated as non-controllable nodes. Pools may be defined according to the above examples, other configurations, or any combination thereof as desired for a desired application.

While the description in connection with FIG. 5 (as well as FIGS. 6 and 7 below) is made with reference to pools of compute and/or system nodes, this is merely an example of the technology disclosed herein. The disclosed technology is not intended to be limited to pools of compute nodes. For example, the processes disclosed herein can be applied to pools of any system equipment, such as, but not limited to, compute nodes, system nodes, compute units, system devices, or any component on the HPC system that consumers power.

At operation 502, a trigger event can be detected that triggers initiation of process 500. The trigger event can be a system events, such as initiating of job or workload; receipt of a requested power cap or power budget, such as an update to a previously inputted requested power cap/power budget; period of time, such as detected by a timer. In the case of timer, which may be included in a controller 115 for example, a period of time may be set in advance that defines an interval between repeated executions of process 500. The period of time may be any amount of time desired for a given application, for example but not limited to, once a week, once a day, once an hour, once a minute, every 10 seconds, every 1 second, etc. In an illustrative example, the period of time may be 20 seconds such that process 500 can be performed every 20 seconds. In any case, upon passage of each period of time, process 500 is executed, which provides for a continuous power management by enabling a dynamic optimization of power cap allocation of the system. That is, the system can continuously check power usage and current configurations to ensure optimal allocation of power caps to controllable compute nodes on the system.

Operation 502 also includes obtaining user-defined system configuration parameters, such as a requested system power cap, power budgets, distribution policies, pool designations, pool priorities, pool specific power caps, and the like. A pool specific power cap (or pool power cap) refers to a power cap set for a given pool. Each pool of nodes may be assigned a corresponding pool power cap. However, if a pool power cap is not assigned, the pool power cap is set to a maximum power cap of that pool (e.g., sum of all maximum power cap values of the nodes that make up the pool). The user-defined system configuration parameters may be received as inputs, for example, from an end-user via front-end system 130. In one example, receipt of one or more user-defined system configuration parameters may function as a trigger event. For example, an end-user may input a requested system power cap (e.g., Requested_Power_Cap described above), a requested power budget, and/or one or more pool power caps that triggers process 500 responsive to the input. In some examples, the input may be an updated system/pool power cap or power budget that triggers a re-optimization of the power cap allocation. As another example, pool designations and/or pool priorities may be input and/or updated by the end-user, which triggers process 500.

Where a detected trigger event is based on passage of a period of time, job/workload, or otherwise not based on updating user-defined system configuration parameters, operation 502 may include obtaining previously stored user-defined system configuration parameters (e.g., stored in storage 114) for use in process 500. Alternatively, user-defined system configuration parameters may be obtained later in process 500.

At operation 504, an inventory of nodes on the system is obtained. In the case where a prior instance of process 500 was executed, the obtained inventory at operation 504 can be used to update a previously obtained inventory held, for example, in storage 114. Operation 504 may be similar to the context definition phase 210 described above in connection with FIG. 2. That is, for example, the power cap distribution system 110 may obtain an inventory of compute nodes 122 and system nodes 124 via the inventory interface 118. Inventory information may include a count of the total number of compute nodes and unique identifiers, along with numbers and identifiers of system nodes 124. The inventory may include a number of unique model or type identifiers distinguishing between compute node types and a number of compute nodes for each type. The inventory may include configuration information that identifies system components as either controllable or non-controllable power consuming components. In the case where a prior instance of process 500 was executed, the obtained inventory at operation 504 can be used to update a previously obtained inventory held, for example, in storage 114.

At operation 506, power cap ranges are obtained for each compute node and/system node type identified in the inventory information. Operation 506 may be similar to operation

212 of FIG. 2. For example, power cap distribution system 110 may obtain hardware defined power cap information of each node type through power cap interface 116. As described above, the power cap information may include minimum and maximum power caps for compute nodes 122. Additionally, the power cap information may include a power cap delta for each compute node type, or the power ap delta may be determined from the maximum and minimum power caps. The power cap information may also include power cap values for system nodes 124.

At operation 508, current pool and node power caps are obtained. Operation 508 may be similar to operation 212 of FIG. 2. For example, power cap distribution system 110 may use the power cap interface 116 to obtain current power cap settings of all nodes 122 and 124 on the HPC system. Additionally, power cap distribution system 110 can obtain current power cap settings of each pool of nodes through power cap interface 116, or may be determined from a summation of current power cap settings of nodes assigned to each pool. In some cases, the current power cap settings may be a result of a previously executed iteration of process 500. The current power cap settings maybe included in the power cap information, for example, by appending the power cap settings to the maximum and minimum power cap values obtained at operation 506.

At operation 510, current system-wide configuration state is obtained. For example, the system-wide configuration state may be obtained as configuration information that defines the current configuration of the system, such as such as number of compute and/or system nodes, power cap ranges and/or values, current power consumption by each node, etc. The system-wide configuration may also contain information that identifies each pool and corresponding nodes 122 and/or 124 that are clustered into each pool. In an example implementation, storage 114 may comprise pool identifiers that represent each pool, where each pool identifier is assigned to one or more node 122 and/or 124 through an association with the unique identifiers of the one or more nodes 122 and/or 124. The system-wide configuration may also comprise priority designations associated with each pool, where the priority designation identifies a priority level assigned to each respective pool. Each priority level may be assigned to one or more pools (e.g., multiple pools or one pool may be assigned to a given priority level). In some implementations, for example where user-defined system configuration parameters was not defined or obtained at operation 502, operation 510 may include obtaining previously set (e.g., current) user-defined system configuration parameters, for example, by issuing a code call (e.g., GET command) to storage 114 to obtain the previously set user-defined system configuration parameters. Further details on pool creation are provided below in connection with FIG. 6.

In some implementations, controllable compute nodes may be clustered into pools, and any compute nodes that are not clustered may be added to an reserve pool. The reserve pool may comprise non-controllable system nodes, along with non-clustered compute nodes. In this example, non-clustered compute nodes are then treated as non-controllable system nodes with a power cap value set as the maximum power cap value of the non-clustered compute nodes power cap range.

In another example, controllable compute nodes that are not clustered into a user-defined pool can be clustered into a remainder pool, separate from non-controllable system nodes. The compute nodes in the remainder pool can be allocated power caps through optimization techniques disclosed herein, but with a lowest priority such that the remainder pool is the last pool allocated as described below.

At operation 512, process 500 determines if the Requested_Power_Cap for the entire system (e.g., from the user-defined system configuration parameters) is within an effective settable range. That is, if the Requested_Power_Cap exceeds or is equal to the effective settable range of power caps, the system-wide power cap for the controllable compute nodes can be set to an upper bound (e.g., maximum) of effective settable range of power caps. If the Requested_Power_Cap is less than a lower bound of the effective settable range of power caps (e.g., a minimum), then an error can be returned as a solution is not possible under the current system configuration, the Requested_Power_Cap can be adjusted to the lower bound, and/or controllable compute nodes can be deactivated to provide for the Requested_Power_Cap. Otherwise, the Requested_Power_Cap is considered to be within the effective settable range and the Requested_Power_Cap can be set as the system-wide power cap for the controllable compute nodes, from which power caps for each pool can be calculated as described herein. Additional details for the determination at operation 512 can be found above in connection with FIGS. 2 and 3.

In some implementations, responsive a determination that the Requested_Power_Cap is less than a lower bound of the effective settable range, operation 512 may also include generating a recommendation of an corrective action and transmitting the recommendation to the front-end system 130 for consideration by an end-user. For example, a corrective action may include increasing the Requested_Power_Cap to at least the lower bound (or higher). In another example, operation 512 may determine one or more compute nodes (or pools) to be deactivated so as to reduce the lower bound to match or be below the Requested_Power_Cap and provide a recommendation that identifies the determined compute nodes (or pools) to the end-user via front-end system 130. The end-user may accept the recommendation, thereby enabling a solution to be computed and permitting process 500 to proceed to operation 514.

Further at operation 512, if the Requested_Power_Cap is within the effective settable range, the power caps for each pool (including a remainder pool if present) are tabulated at a pool minimum power cap value (Pool_Sum_Min). The pool minimum power cap may be a summation of minimum power cap values of all compute nodes included in each respective pool. That is, for each pool, a sum of minimum power cap values for all compute nodes can be determined using minimum power caps of each compute node type multiplied by the number of compute nodes of a respective type that make up each respective pool.

Whereas, if the determination at operation 512 is No (e.g., the Requested_Power_Cap is outside the effective settable range), the process proceeds to operation 524. In the case where the Requested_Power_Cap exceeds or is equal to the effective settable range of power caps, all controllable compute nodes can be set to the maximum power cap. In the case where the Requested_Power_Cap is less than a lower bound of the effective settable range of power caps, an error can be returned, the Requested_Power_Cap can be to lower bound, and/or controllable compute nodes can be deactivated to provide for the Requested_Power_Cap and the process repeated.

At operation 514, each pool is iteratively considered in order of priority level. For example, a priority level may be assigned to each pool (e.g. in the user-defined system configuration parameters) that ranks the pools in a prioritized order in terms of power consumption (e.g., pools that can be permitted to or are desired by a user to have prioritized access to power). The highest prioritized pool (or pools) can be considered first, and the remaining pools iterated over according to the prioritized order until all pools are considered (or there is no available power budget to allocate to subsequent pools).

At operation 516, a determination is made as to whether a pool delta for a current pool is less than an available power budget. The pool delta refers to the absolute difference between a Pool_Sum_Max and a Pool_Sum_Min. The Pool_Sum_Min is described above, and the Pool_Sum_Max refers to a sum of maximum power caps for all compute nodes that can be determined using maximum power caps of each compute node type multiplied by the number of compute nodes of a respective type that make up the current pool. The available power budget is the power budget remaining from a requested power budget after subtracting power cap values of all non-controllable compute nodes (and maximum power cap values of any controllable system equipment that have been designated as do not manage) and power cap values allocated to each pool from a requested power budget. Thus, at a first iteration where all pools are tabulated at Pool_Sum_Min, the available power budget is the power budget remaining after subtracting the sum of power cap values of all non-controllable compute nodes (and maximum power cap values of any controllable compute nodes that have been designated as do not manage)) and the sum of all Pool_Sum_Mins for the pools (e.g., reserve power). In this example, the requested power budget is provided as the power cap determined at operation 512. After each iteration, the Pool_Sum_Min for a considered pool is replaced with the sum of allocated power caps, as described below in operation 522.

If the pool delta for the current pool is equal to or greater than the available power budget, the pool power cap is computed at a maximum power cap, at operation 518. For example, power caps for each controllable compute node of the current pool is set to a maximum power cap value and the power cap for the pool can is computed as a sum of power caps of the controllable compute nodes (e.g., Pool_Sum_Max).

If the pool delta is less than the available power budget, the pool power cap is adjusted at operation 520, for example, increasing the power cap from the minimum power cap value. For example, operation 520 can include computing optimized the power caps of the controllable compute nodes for the current pool. Operation 520 may be substantially similar to operation 222 of FIG. 2, at which a power cap allocation solution for the controllable compute nodes can be computed based on application of one or more distribution schemes, as described above in connection with FIG. 2. The current pool at operation 520 can be treated as the system in the context of operation 222, such that an optimal allocation of power caps can be computed for controllable compute nodes. Operation 520 may access distribution scheme file 224 according to a distribution policy set in the user-defined system configuration parameters to execute distribution schemes as described above in connection with FIGS. 2 and 4.

In either case, at operation 522, a remaining power budget is tabulated and set as an updated available power budget for the next pool according to the prioritized order. For example, the power caps allocated to controllable compute nodes of a pool can be summed together and subtracted from the available power budget from operation 514. Process 500 then repeats steps 516-522 for the next pool, which may include application of the same or different distribution scheme for the next pool. That is, distribution schemes applied to each pool may be the same or different, depending on distribution policies set by the end-user.

Once all pools are considered (or there is no remaining power budget), the process 500 proceeds to operation 524 where the computation of the power cap allocation solution is completed and an optimal solution obtained, as described above. At operation 526, the power cap distribution solution can be applied to the controllable compute nodes system-wide. Operation 526 may be substantially similar to operation 232 of FIG. 2.

At operation 528, system configuration states are updated and stored. For example, the system configuration, pools delineation, per pool power caps, node power caps may be stored, for example, in storage 114 for later access, such as a subsequent iteration of process 500.

In a case where multiple pools are assigned to the same priority level, each pool of the same priority level can be processed at the same time. For example, each priority level may be assigned a power budget (e.g., based on inputs from an end-user). For a given priority level, at operation 514, the assigned power budget is split amongst the pools of the priority level and then per pool power cap distributions are determined that. For example, a per pool power budget can be determined from the priority level power budget by subtracting a sum of the Pool_Sum_Mins of all pools assigned to the priority level and distributing this result amongst the pools. The resulting per pool power budget can be determined by any one of the distribution schemes described herein (e.g., "even_split"; "equal_pertantage"; "count_down"; and "delete_by_delta", etc.). Once each a per pool power budget is determined for each pool, a distribution of the power caps for nodes of each pool can be determined from operations 516-520, where each pool is processed in parallel.

In some implementations, a pool may comprise a plurality of nodes, which may be further clustered into a number of sub-pools. In this case, the process 500 may be performed on the sub-pools by treating the sub-pools as the pools described in 500. Thus, process 500 may be applicable to any number of hierarchal levels of pool abstractions, which can be divided down to any desired level.

Further, while process 500 is described as computing a pool minimum power cap at operation 512 and then adjusting power cap values until the allocated power cap and sum of power cap values of non-controllable system nodes reaches the requested power budget, other implementations are possible within the scope of the present disclosure. For example, operation 512 may include tabulating pools at Pool_Sum_Max and then iterating over the pools in reverse prioritized order (e.g., lowest priority level pools first). For each pool, at operation 520, power cap values are computed that reduce the power caps from the maximum power cap values to an optimal distribution, and a updated power budget is tabulated at operation 522. The process continues iteratively over each pool in reverse priority order until the updated power budget at operation 522 reaches the requested power budget.

Figure 6:
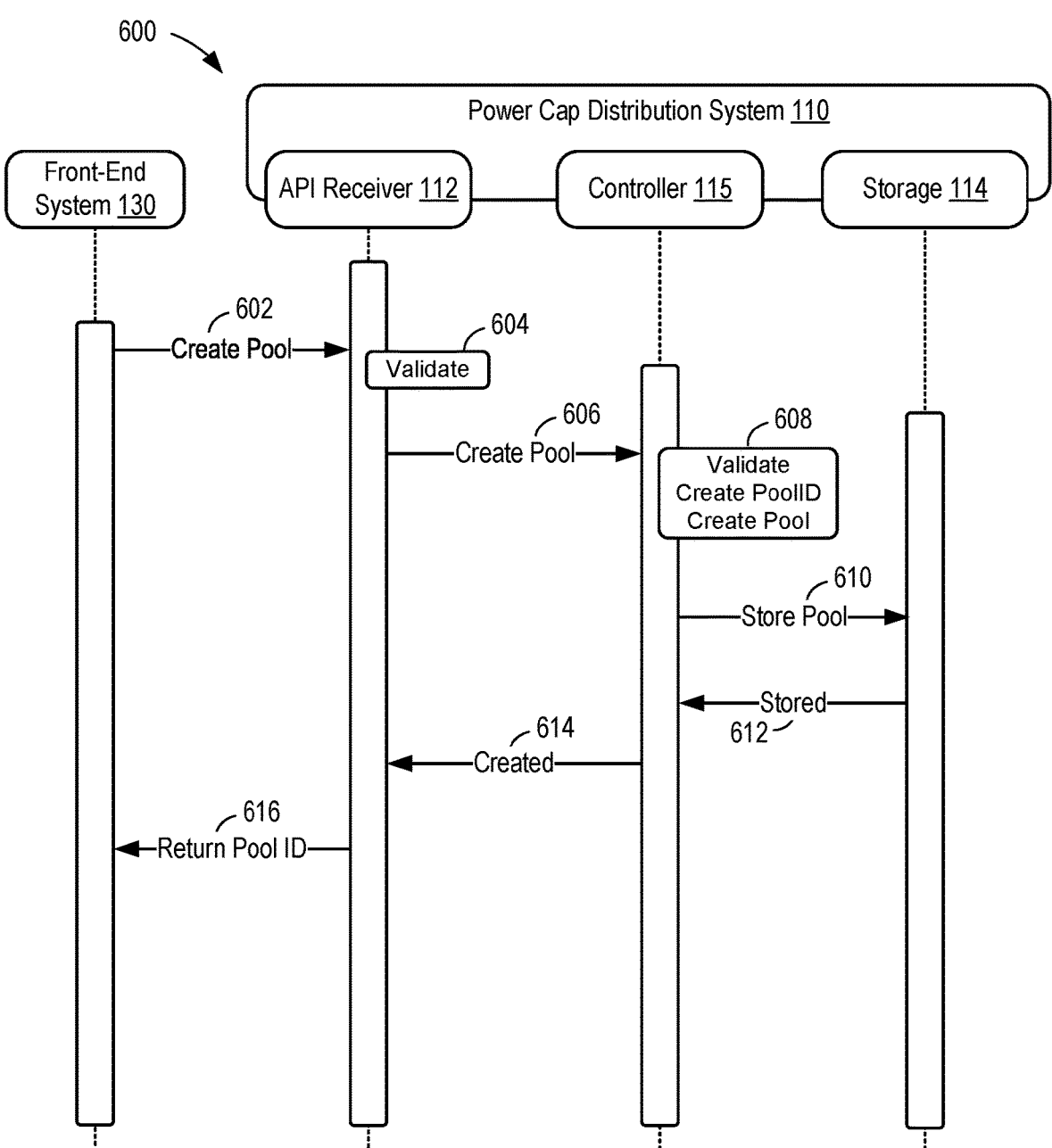
FIG. 6 is a sequence diagram of an example message flow reflecting operations performed to create a pool in accordance with implementations disclosed herein.

FIG. 6 is a sequence diagram of an example message flow 600 reflecting operations performed to create a pool in accordance with implementations disclosed herein. FIG. 6 illustrates components of system architecture, such as architecture 100. More particularly, FIG. 6 depicts a front-end system 130 communicatively coupled to power cap distribution system 110, which includes API receiver 112, controller 115, and storage 114 as described above in connection with FIG. 1.

In operation, front-end system 130 communicates a message 602 to architecture 100. Message 602 comprises a request to create a pool and assigning nodes (e.g., compute nodes 122 and/or system nodes 124) to the requested pool. Message 602 may comprise a payload that includes information identifying the one or more nodes to cluster into the requested pool, for example, by listing of unique identifiers of each node. In some implementations, the payload of message 602 may also include a description of the requested pool; a management flag to toggle whether or not the pool is to be managed or not (e.g., if set to "True" the pool can be managed, of if set to "False" the pool is not managed); requested power cap and/or power budget (e.g., a power cap may be provided as a upper and lower bound); a priority level designated for the requested pool; and an identification of a distribution scheme to apply (if none are designated than an optimal distribution scheme may be identified through comparison of results of distribution schemes as described above). Message 602 is received by API receiver 112, which validates the request at process 604. For example, API receiver 112 verifies that message 602 is a complete and processable payload (e.g., verifying information contained in the payload is not nonsensical or otherwise not unrecognizable by the power cap distribution system 110 and thus can be processed). In an example, message 602 is generated responsive to inputs from an end-user executed on dashboard 132 that indicates nodes to be clustered into a requested pool.

Once validated, API receiver 112 forwards the request to create a pool as message 606 to Controller 115. Controller 115 validates message 606 (e.g., similar to the validation at process 604) and, upon validation of the message 606, creates a pool identifier and associates each node identified in the message 606 with the pool identifier, thereby creating the requested pool. In an example implementation, the created pool identifier is associated or otherwise linked to the unique identifiers of nodes listed in the message 606. In an example implementation, all nodes 122 and 124 can be associated with a reserve pool (e.g., based on information obtained over inventory interface 118). Then, upon receipt of message 606, controller 115 transfers the nodes identified in message 606 to a created pool by associating the unique identifies of the nodes with the pool identifier. Controller 115 then stores the pool at storage 114 by storing the associations of identifiers.

Once the pool is created and stored in storage 114, a confirmation that the pool was created is communicated to front-end system 130. For example, storage 114 sends message 612 including an acknowledgement that the pool was stored. Controller 115 then creates a message 614 that confirms the pool was created and stored in storage 114, which is provided to API receiver 112. API receiver 112 packages the confirmation into message 616 along with an identification of the pool identifier, which is returned to front-end system 130 as message 616. The pool identifier can then be provided to the end-user via dashboard 132 executed on front-end system 130.

Message flow 600 can be performed a number of times to create a number of pools. Furthermore, Message flow 600 can executed a number of times in parallel, sequentially, or any combination thereof to create a number of pools simultaneously and/or sequentially. In some examples, message 602 may include a request to create a number of pools, with a listing of nodes to be clustered into each pool. Message flow 600 can then be performed to create the number of pools simultaneously.

While FIG. 6 provides an example of a creation of a requested pool, as alluded to above reserve and/or remainder pools may also be provided. That is, based on a request to create a pool, controller 115 may create the pool at process 608, for example, by transferring identified nodes from a reserve pool of all nodes on the system, thereby leaving any nodes not identified in the create pool message 606 associated with the reserve pool. In another example, controller 115 may create a requested pool at process 608, along with creating a remainder pool of non-clustered nodes that were not identified in the create pool message 606. The remainder pool maybe be assigned a pool identifier, which can be associated with unique identifies of any non-clustered compute nodes to create the remainder pool.

Figure 7:
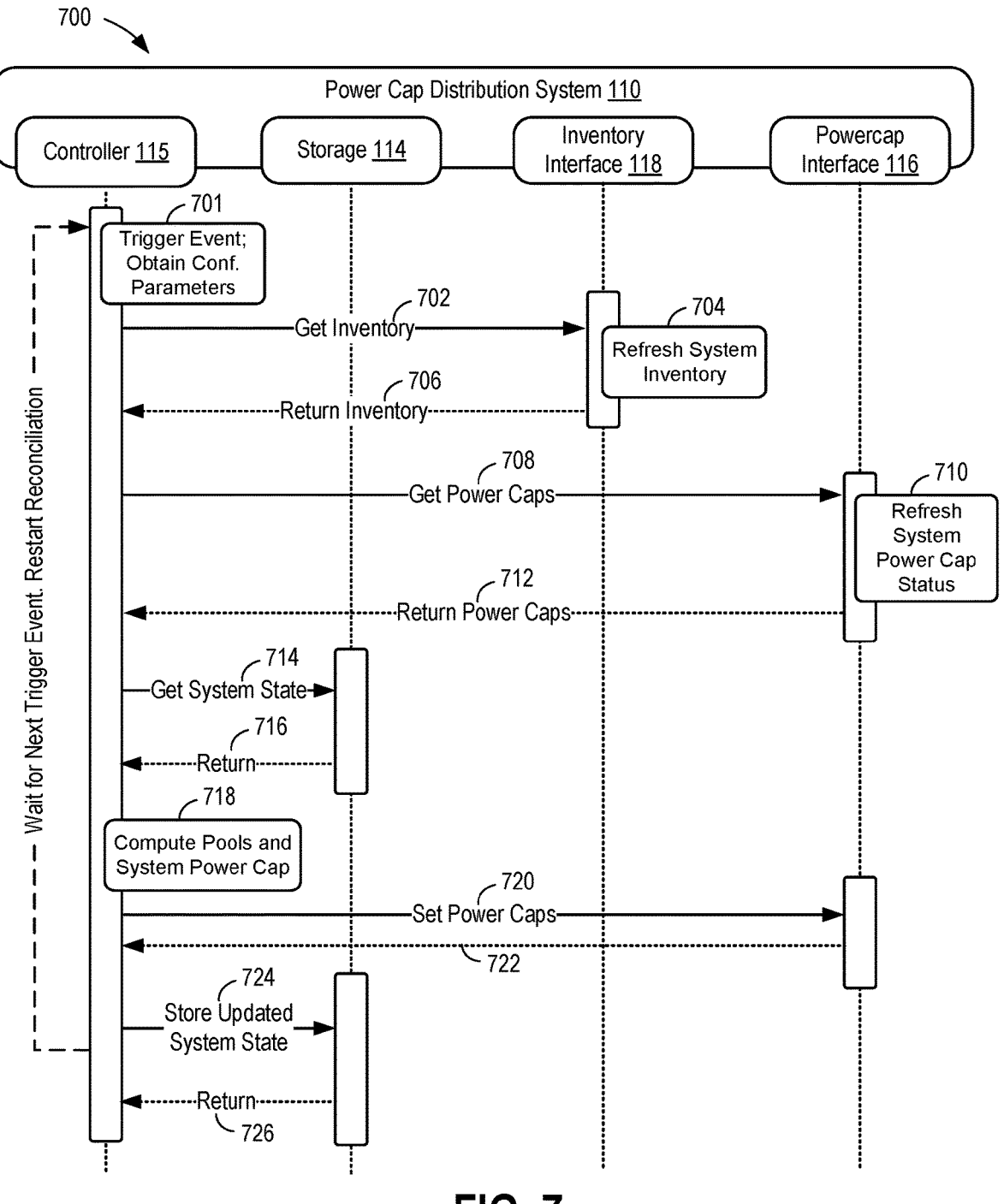
FIG. 7 is a sequence diagram of an example message flow reflecting operations performed to distribute system power caps in accordance with implementations disclosed herein.

FIG. 7 is a sequence diagram of an example message flow 700 reflecting operations performed to distribute system power caps in accordance with implementations disclosed herein. FIG. 7 illustrates components of system architecture, such as architecture 100. More particularly, FIG. 7 depicts a power cap distribution system 110 including, but not limited to, controller 115, storage 114, inventory interface 118, and power cap interface 116 as described above in connection with FIG. 1.

In operation, at process 701, a trigger event can be recognized or otherwise detected by controller 115. Also at 502 also includes obtaining user-defined system configuration parameters, such as requested system power caps and/or power budgets, distribution policies, pool designations (if any), pool priorities (if any), and the like. The user-defined system configuration parameters may be received as inputs, for example, from an end-user via front-end system 130. For example, process 701 may be an example of operation 502 of FIG. 5 and/or operation 204 of FIG. 2.

Controller 115 communicates message 702 to inventory interface 118 to request inventory of an HPC system. In an example implementation, message 702 comprises a code call (e.g., a GET command) requesting inventory information of the HPC system. Responsive to message 702, inventory interface 118 performs process 704 to refresh the HPC system inventory. For example, inventory interface 118 requests updated inventory information from the HPC system, which inventory interface 118 uses to refresh system states (e.g., current system configurations, such as compute and system nodes on HPC system, numbers of compute/system nodes, node types, numbers of each type, etc.). The refreshed system inventory is returned to controller 115 as message 706. One or more of message 702, process 704, and message 706 may be included as part of operation 504 of FIG. 5. In another example, one or more of message 702, process 704, and message 706 may be included as part of context definition phase 210 of FIG. 2, for example, as part of operation 212. In some implementations, controller 115 may store the returned system inventory information in storage 114.

Controller 115 then communicates message 708 to power cap interface 116 to request power cap information of the HPC system. In an example implementation, message 708 comprises a code call (e.g., a GET command) requesting power cap information as described above. Responsive to message 708, power cap interface 116 performs process 710 to refresh the HPC system power cap status. For example, power cap interface 116 requests updated power cap from the HPC system, which power cap interface 116 uses to refresh power cap status of each node type on the HPC system (e.g., maximum/minimum power cap ranges for controllable nodes, power cap values for non-controllable nodes, etc.). The refreshed system power cap information is returned to controller 115 as message 712. One or more of message 708, process 710, and message 712 may be included as part of operation 506 of FIG. 5. In another example, one or more of message 708, process 710, and message 712 may be included as part of context definition phase 210 of FIG. 2, for example, as part of operation 212. In some implementations, controller 115 may store the returned system power cap information in storage 114.

Controller 115 can then communicate message 714 to storage 114 requesting system states. Messages 714 may comprise a code call (e.g., GET command) request a system-wide configuration state of the HPC system, which storage 114 may respond to with message 716 comprising the current system-wide configuration state.

In an example implementation, messages 714 and/or 716 may be examples of operations performed during context definition phase 210. Thus, the controller 115 can obtain current configuration of the system, such as such as number of compute and/or system nodes, power cap ranges and/or values, current power consumption by each node, etc.

In another example, messages 714 and/or 716 may be examples of operations 508 and 510 of FIG. 5. Thus, controller 115 can obtain pool usage and node usages, along with number of compute and/or system nodes, power cap ranges and/or values, current power consumption by each node, etc. Furthermore, the system-wide configuration obtained at messages 716 may also contain information that delineates the pools, created during message flow 600 above, that cluster one or more nodes 122 and/or 124 into respective pools.

Once the current system configuration states are obtained, controller 115 computes system power caps at process 718. In one example, process 718 may be an example of computation phase 220 during which a power cap allocation solution can be computed as described above. In another example, process 718 may be an example of operations 512-522 of FIG. 5, during which pool based power cap allocation solution can be computed as described above.

In either case, once an optimal power cap allocation solution is computed, controller 115 communicates message 720 to power cap interface 116. Message 720 comprises instructions to set power caps on a per controllable compute node basis, that the power cap interface 116 forwards to the HPC system. Message 720 may be an example of operation 232 of FIG. 2 and/or operation 526 of FIG. 5. The power cap interface 116 responds with message 722 acknowledging receipt of message 720. In an example, upon power caps being set at the controllable compute nodes, power cap interface 116 communicates a confirmation along with updated system configuration states, which may be packaged with the acknowledgement or sent as a second message 722. Upon receipt of the confirmation from power cap interface 116, controller 115 communicates message 724 to storage 114 to store the updated system configuration states, and storage 114 returns a confirmation message 726 that the updated system configuration states are stored. Message flow 600 then waits for the next trigger event to be detected. Communicates message 724 may be an example of operation 528 of FIG. 5.

FIG. 8 illustrates an example computing component that may be used to distribute a system power cap in accordance with various implementations. Referring now to FIG. 8, computing component 800 may be, for example, a server computer, a controller, or any other similar computing component capable of processing data. In the example implementation of FIG. 8, the computing component 800 includes a hardware processor 802, and machine-readable storage medium for 804.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-812, to control processes or operations for allocation a system power cap amongst controllable compute nodes. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some implementations, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-812.

Hardware processor 802 may execute instruction 806 to obtain power cap ranges for a plurality of controllable power consumers and power cap values for a plurality of non-controllable power consumers. The plurality of controllable power consumers may comprise a number of dissimilar types each having dissimilar power cap ranges, and the plurality of controllable power consumers and the plurality of non-controllable system equipment are grouped into a plurality of pools. For example, as described above in connection with FIG. 2, power cap ranges for controllable power consumers of a system can be obtained based on minimum and maximum power cap values for each compute node. As described above, power consumers can refer to any system equipment, such as subsystems, compute nodes, system nodes, compute units, and/or any component or computation device/resource of an HPC system. Further, as describe in connection with FIGS. 5-7, the controllable and/or non-controllable power consumers can be clustered into a number of pools, each of which can be associated with a pool power cap that can be set in advance (e.g., by an end-user).

Hardware processor 802 may execute instruction 808 to calculate a system power cap range for the system based on the power cap ranges and power cap values. For example, as described in greater detail above in connection with FIG. 2, a system power range can be determined from the power cap ranges and power cap values, and an effective settable range of power caps can be determined from the power cap ranges, such as a Sum_Min and Sum_Max for defining the effective settable range. Additionally, as described in connection with FIG. 5, pool minimum power cap (e.g., Pool_Sum_Min) and/or pool maximum power cap (e.g., Pool_Sum_Max) can be tabulated for each pool, and the difference therebetween provides a pool delta.

Hardware processor 802 may execute instruction 810 to, for each pool of a plurality of pools, determine power caps for the plurality of controllable power consumers of a respective pool from a comparison of the requested power cap against the system power cap range. For example, based on an input of a requested power cap, power caps for the plurality of controllable power consumers of a given pool can be determined from a comparison of the requested power cap against the system power cap range. In various examples, power caps for dissimilar types of power consumers are based on dissimilar power cap ranges.

As described above in connection with FIG. 5, an input can be received specifying a requested power cap for the system. Responsive to the input, a power cap for the controllable power consumers can be set by comparing the requested power cap to the effective settable range of power caps, as described above. Once the power cap for the controllable power consumers of the system is set, each pool can be considered on a pool-by-pool basis in order of a defined priority level to distribute an available power cap to controllable power consumers of the pool, based in part on a comparison of a pool delta to the available power cap and application of a distribution scheme, as described above in connection with FIG. 5. In some examples, a plurality of distribution schemes can be executed on each pool and, based on distribution policies, and an optimal distribution of power caps for allocation to the controllable power consumers of each pool can be determined. For example, for each distribution scheme, a solution utilization can be determined and compared to that of other distribution schemes to identify a best fit or optimal distribution of power caps amongst the controllable power consumers of a given pool.

Hardware processor 802 may execute instruction 812 to provide the determined power caps to the system, such that the determined power caps are applied to each of the plurality of controllable power consumers. Thus, each controllable power consumers can be controlled to set a power cap according to the determined power cap distribution. As a result, the system can then operate such that the system-wide power usage does not to exceed the requested power cap.

Figure 9:
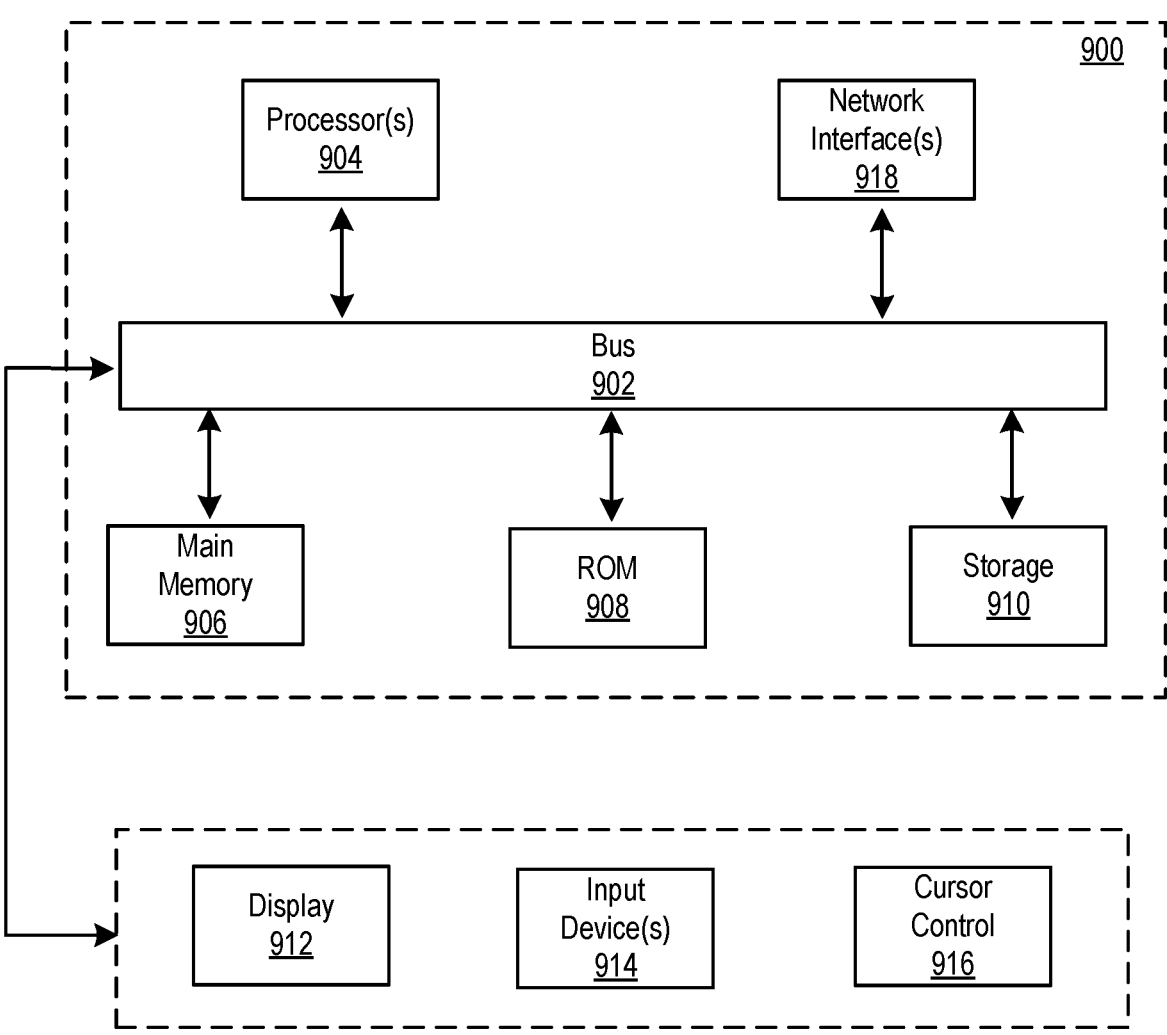
FIG. 9 is an example computer system that may be used to implement various features of distributing a system power cap of the present disclosure.

FIG. 9 depicts a block diagram of an example computer system 900 in which various of the implementations described herein may be implemented. The computer system 900 includes a bus 902 or other communication mechanism for communicating information, one or more hardware processors 904 coupled with bus 902 for processing information. The computer system 900 may be an example implementation of components disclosed herein, such as, power cap distribution system 110; controller 115; one or more of compute nodes 122; and/or front-end system 130 of FIG. 1. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. For example, main memory 906 may store process 200 as instructions that are executable by processor 904 to perform the operations thereof. Similarly, main memory 904 may store instructions 806-812 that can be executed processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some implementations, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one implementation, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative implementations, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example implementations. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain implementations include, while other implementations do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for applying a system power cap on a heterogeneous system, the method comprising:

obtaining, by a processor, power cap ranges for a plurality of controllable system equipment and power cap values for a plurality of non-controllable system equipment, the plurality of controllable system equipment comprising a plurality of different equipment types each having a different power cap range, wherein the plurality of controllable system equipment and the plurality of non-controllable system equipment are grouped into a plurality of pools;

calculating a system power cap range for the heterogeneous system from the power cap ranges and power cap values;

receiving, via an interface receiver, the requested power cap specified for the heterogeneous system;

determining, by a processor, power caps for the plurality of controllable system equipment of the plurality of pools based on a comparison of a requested power cap for the heterogeneous system against the calculated system power cap range, wherein determining the power caps for the plurality of controllable system equipment of a respective pool of the plurality of pools comprises:

setting the power caps for the plurality of controllable system equipment for the respective pool to minimum power caps of the different power cap ranges; and incrementing the power caps, from the minimum power caps, based on a remainder of the requested power cap after determining power caps for a pool prior to the respective pool; and providing, by a processor, the determined power caps to the heterogeneous system, wherein the determined power caps are applied to each of the plurality of controllable system equipment.

2. The method of claim 1, wherein each pool of the plurality of pools is assigned a priority level, and wherein the power caps for the plurality of controllable system equipment of the plurality for each respective pool are determined in an order based on the priority level assigned to each respective pool.

3. The method of claim 1, wherein the power caps for a first pool assigned a first priority level are determined before the power caps for a second pool assigned a second priority level that is lower than the first priority level.

4. The method of claim 1, further comprising:

for each pool of the plurality of pools, determining a pool delta power cap based on the power cap ranges of the controllable system equipment that are grouped into the respective pool; and determining that the pool delta power cap is greater than an available power budget, wherein the available power budget is based on the requested power cap, wherein determining the power caps for the plurality of controllable system equipment of the respective pool is based on the determination that the pool delta power cap is greater than an available power budget.

5. The method of claim 4, wherein the power caps for the plurality of controllable system equipment of a respective pool are determined based on a distribution scheme configured to allocate a power cap to each of the plurality of controllable system equipment.

6. The method of claim 5, further comprising:

determining a plurality of power cap allocations using a plurality of distribution schemes;

selecting an optimal power cap allocation from the plurality of power cap allocations; and determining the power caps for the plurality of controllable system equipment of the respective pool based on the selected optimal power cap allocation.

7. The method of claim 4, further comprises:

responsive to a determination that the pool delta power cap is less than or equal to the available power budget, determining the power caps for the plurality of controllable system equipment of the respective pool as a maximum power cap value.

8. The method of claim 1, further comprises:

detecting a trigger event on the heterogeneous system, wherein obtaining power cap ranges for a plurality of controllable system equipment and power cap values for a plurality of non-controllable system equipment is responsive to the detected trigger event.

9. The method of claim 8, wherein the trigger event comprises one or more of a job initiation, receipt of a requested power cap, receipt of a requested power budget, and a periodic timer.

10. The method of claim 1, wherein the power cap ranges are based on hardware architectures of the plurality of controllable system equipment, and wherein the power cap values are based on hardware architectures of the plurality of non-controllable system equipment.

11. A power cap distribution system for applying a system power cap on a heterogeneous system, the power cap distribution system comprising:

a memory configured to store instructions; and one or more processors communicatively coupled to the memory and configured to execute the instructions to:

obtain power cap ranges for a plurality of controllable system equipment and power cap values for a plurality of non-controllable system equipment, the plurality of controllable system equipment comprising a plurality of different equipment types each having a different power cap range, wherein the plurality of controllable system equipment and the plurality of non-controllable system equipment are grouped into a plurality of pools;

calculate a system power cap range for the heterogeneous system from the power cap ranges and power cap values;

receive, via an interface receiver, the requested power cap specified for the heterogeneous system;

determine power caps for the plurality of controllable system equipment of the plurality of pools based on a comparison of a requested power cap for the heterogeneous system against the system power cap range, wherein determining the power caps for the plurality of controllable system equipment of a respective pool of the plurality of pools comprises:

setting the power caps for the plurality of controllable system equipment for the respective pool to minimum power caps of the different power cap ranges; and incrementing the power caps, from the minimum power caps, based on a remainder of the requested power cap after determining power caps for a pool prior to the respective pool; and provide the determined power caps to the heterogeneous system, wherein the determined power caps are applied to each of the plurality of controllable system equipment.

12. The system of claim 11, wherein each pool of the plurality of pools is assigned a priority level, and wherein the power caps for the plurality of controllable system equipment of the plurality for each respective pool are determined in an order based on the priority level assigned to each respective pool.

13. The system of claim 11, wherein the power caps for a first pool assigned a first priority level are determined before the power caps for a second pool assigned a second priority level that is lower than the first priority level.

14. The system of claim 11, wherein the one or more processors are further configured to execute the instructions to:

for each pool of the plurality of pools, determine a pool delta power cap based on the power cap ranges of the controllable system equipment that are grouped into the respective pool; and determine that the pool delta power cap is greater than an available power budget, wherein the available power budget is based on the requested power cap, wherein determining the power caps for the plurality of controllable system equipment of the respective pool is based on the determination that the pool delta power cap is greater than an available power budget.

15. The system of claim 14, wherein the power caps for the plurality of controllable system equipment of a respective pool are determined based on a distribution scheme configured to allocate a power cap to each of the plurality of controllable system equipment.

16. The system of claim 15, wherein the one or more processors are further configured to execute the instructions to:

determine a plurality of power cap allocations using a plurality of distribution schemes;

select an optimal power cap allocation from the plurality of power cap allocations; and determine the power caps for the plurality of controllable system equipment of the respective pool based on the selected optimal power cap allocation.

17. The system of claim 14, wherein the one or more processors are further configured to execute the instructions to:

responsive to a determination that the pool delta power cap is less than or equal to the available power budget, determine the power caps for the plurality of controllable system equipment of the respective pool as a maximum power cap value.

18. The system of claim 11, wherein the one or more processors are further configured to execute the instructions to:

detect a trigger event on the heterogeneous system, wherein obtaining power cap ranges for a plurality of controllable system equipment and power cap values for a plurality of non-controllable system equipment is responsive to the detected trigger event.

19. The system of claim 18, wherein the trigger event comprises one or more of a job initiation, receipt of a requested power cap, receipt of a requested power budget, and a periodic timer.

20. A non-transitory computer-readable storage medium for distributing power caps, configured with instructions executable by one or more processors to cause the one or more processors to perform operations comprising:

calculating a power cap range for a pool of controllable system equipment from a system power cap range of a heterogeneous system, and a plurality of power cap ranges of a plurality of controllable system equipment comprised in the pool of controllable system equipment, wherein the plurality of controllable system equipment comprises a plurality of different equipment types each having a different power cap range;

setting the power caps for the plurality of controllable system equipment to minimum power caps of the plurality of power cap ranges;

receiving, via an interface receiver, a power cap set for the heterogeneous system;

computing a power cap allocation solution based on the received power cap set for the heterogeneous system and the calculated power cap range, the power cap allocation solution distributing a remainder of the power cap set for the system, after allocating power caps to another pool of controllable system equipment of the heterogeneous system, amongst the plurality of controllable system equipment;

applying the power cap allocation solution to the heterogeneous system on a per-controllable system equipment basis; and automatically repeating the calculating, the computing, and the applying responsive to a periodic timer.

\*     \*     \*     \*     \*